United States Patent
Kitamura

(10) Patent No.: US 10,824,395 B2
(45) Date of Patent: Nov. 3, 2020

(54) ARITHMETIC PROCESSING DEVICE AND CONTROL METHOD FOR ARITHMETIC PROCESSING DEVICE

(71) Applicant: FUJITSU LIMITED, Kawasaki-shi, Kanagawa (JP)

(72) Inventor: Kenichi Kitamura, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 157 days.

(21) Appl. No.: 16/243,133

(22) Filed: Jan. 9, 2019

(65) Prior Publication Data

US 2019/0227771 A1 Jul. 25, 2019

(30) Foreign Application Priority Data

Jan. 24, 2018 (JP) ................. 2018-009607

(51) Int. Cl.
*G06F 7/548* (2006.01)
*G06F 7/544* (2006.01)

(52) U.S. Cl.
CPC ............ *G06F 7/548* (2013.01); *G06F 7/5443* (2013.01); *G06F 2101/04* (2013.01)

(58) Field of Classification Search
CPC ..... G06F 7/548; G06F 7/5443; G06F 2101/04
USPC ................................. 708/440, 276
See application file for complete search history.

(56) References Cited

U.S. PATENT DOCUMENTS

| 8,533,248 | B2* | 9/2013 | Hondou ................. G06F 7/548 |
| | | | 708/276 |
| 9,477,442 | B2* | 10/2016 | Hondo ..................... G06F 7/556 |
| 2008/0228846 | A1 | 9/2008 | Hondou et al. |
| 2009/0187749 | A1 | 7/2009 | Tanabe |
| 2010/0332573 | A1 | 12/2010 | Hondou |

FOREIGN PATENT DOCUMENTS

| JP | 2008-234076 | 10/2008 |
| JP | 2009-169767 | 7/2009 |
| JP | 2011-013728 | 1/2011 |

* cited by examiner

*Primary Examiner* — Tan V Mai
(74) *Attorney, Agent, or Firm* — Fujitsu Patent Center

(57) ABSTRACT

An arithmetic processing device includes a coefficient memory storing coefficients of a Taylor series expansion of a trigonometric function, a multiply-add arithmetic unit, a first bypass path supplying an output of the multiply-add arithmetic unit to a register file, an OR circuit calculating OR of a sign bit of the output of the multiply-add arithmetic unit and a least significant bit of a second input, a first selector selecting either a first input y or a value "1.0" an EOR circuit calculating an EOR of a first bit of the second input and a sign bit of an output of the first selector, and a second bypass path supplying the least significant bit of the second input to a coefficient selector. The multiply-add arithmetic unit executes an auxiliary instruction repeatedly while modifying a coefficient index from a maximum value to a minimum value to calculate sin (x).

6 Claims, 24 Drawing Sheets

FIG. 4

$$\sin y = \sum_{n=0}^{7} ((-1)^n / (2 \cdot n + 1)!) \cdot (x - x0)^{2n+1}$$

$$= y^1 - (1/3!) \cdot y^3 + (1/5!) \cdot y^5 - \ldots - (1/15!) \cdot y^{15}$$

$$\cos y = \sum_{n=0}^{7} ((-1)^n / (2 \cdot n)!) \cdot (x - x0)^{2n}$$

$$= y^0 - (1/2!) \cdot y^2 + (1/4!) \cdot y^4 - \ldots - (1/14!) \cdot y^{14}$$

FIG. 6 sin(x-x0)

| EXPANSION POINT OF TAYLOR SERIES | | $x0 = \pi/2 * qx$<br>$qx = int(x/(\pi/2))$ |
|---|---|---|
| $bqx = qx\%4$ | EXPANSION FUNCTION | TAYLOR SERIES |
| 00 | $\sin(x-x0)$ | $\Sigma(-1)**n/(2*n+1)!*(x-x0)**(2*n+1)$ |
| 01 | $\cos(x-x0)$ | $\Sigma(-1)**n/(2*n)!*(x-x0)**(2*n)$ |
| 10 | $-\sin(x-x0)$ | $-\Sigma(-1)**n/(2*n+1)!*(x-x0)**(2*n+1)$ |
| 11 | $-\cos(x-x0)$ | $-\Sigma(-1)**n/(2*n)!*(x-x0)**(2*n)$ |

FIG. 7

$\sin(y) = \sin(x - x_0)$

| bqx = qx%4 | | CALCULATION FORMULA |
|---|---|---|
| [1] | [0] | |
| 0 | 0 | $\sin(y) = (y^0 - a_3 y^2 + \cdots - a_{15} y^{14}) * y$ |
| 0 | 1 | $\cos(y) = (y^0 - b_2 y^2 + \cdots - b_{14} y^{14}) * 1.0$ |
| 1 | 0 | $-\sin(y) = (y^0 - a_3 y^2 + \cdots - a_{15} y^{14}) * (-y)$ |
| 1 | 1 | $-\cos(y) = (y^0 - b_2 y^2 + \cdots - b_{14} y^{14}) * (-1.0)$ |

FIG. 8

| Ftrismuld | Ftrismuld rs1, rs2, rd<br>rd = (rs1 * rs1) \| (rs2[0] << 63) |
|---|---|
| EXAMPLE | Ftrismuld y, bqx, y2t<br>y2t = (y*y) \| (bqx[0] << 63) |
| Ftrisseld | Ftrisseld rs1, rs2, rd<br>rd = ((rs2[0]) ? 1.0 : rs1) ^ (rs2[1] << 63) |
| EXAMPLE | Ftrisseld y, bqx, ys<br>ys = ((bqx[0]) ? 1.0 : y) ^ (bqx[1] << 63) |

FIG. 11

| Ftrimaddd | Ftrimaddd rs1, rs2, index, rd<br>rd = rs1 * Fabs(rs2) + T[rs2[63]] [index] |
|---|---|
| EXAMPLE 1 | Ftrimaddd c0, y2t, 7, r<br>r = c0 * Fabs(y2t) + T[y2t[63]] [7] |
| EXAMPLE 2 | Ftrimaddd r, y2t, index, r  (index=6~0)<br>r = r * Fabs(y2t) + T[y2t[63]] [index] |
| Fmuld | Fmuld rs1, rs2, rd<br>rd = rs1*rs2 |
| EXAMPLE | Fmuld r, ys, r<br>r = r*ys |

FIG. 12

| OPERATION CODE | | OPERATION CONTENT |
|---|---|---|
| lddf | [],x | # x = mem |
| fmaddd | x,rp2,bg,bqx | # bqx = x * (1/(π/2)) + 1.5*2**52<br># = int (x * (1/(π/2))) + 1.5*2**52<br># = qx + 1.5*2**52 |
| fsubd | bqx,bg,qx | # qx = bqx - 1.5*2**52<br># = int (x * (1/(π/2)) |
| fnmsubd | qx,p2a,x,y | # y = x - qx * (π/2) |
| fnmsubd | qx,p2b,y,y | # y = y - qx * REMAINDER OF π/2<br># = x - int (x * (1/(π/2)*(1/(π/2))<br># = x - x0 |
| ftrismuld | y,bqx,y2t | # y2t = y2 \| (bqx[0]<<63)<br># = (x-x0)2 \| (((qx%4)%2) << 63) |
| ftrisseld | y,bqx,ys | # ys = ((bqx[0]) ? 1.0 : y)^(bqx[1]<<63)<br># = (((qx%4)%2) ? 1.0 : (x-x0))<br># ^ (((qx%4)/2) << 63) |

FIG. 13

| OPERATION CODE | | OPERATION CONTENT |
|---|---|---|
| Ftrimaddd | c0,,y2t,7,r | # r = 0.0 * y2t[62:0] + COEFFICIENT 7<br># = COEFFICIENT 7 |
| Ftrimaddd | r,y2t,6,r | # r = r * y2t[62:0] +COEFFICIENT 6<br># =COEFFICIENT 7 * (x-x0)**2 +COEFFICIENT 6 |
| Ftrimaddd | r,y2t,5,r | # r = r * y2t[62:0] +COEFFICIENT 5<br># = (COEFFICIENT 7 .. +COEFFICIENT 6) * (x-x0)**2 + COEFFICIENT 5 |
| Ftrimaddd | r,y2t,4,r | # r = r * y2t[62:0] +COEFFICIENT 4<br># r = ((COEFFICIENT 7 .. + COEFFICIENT 5) * (x-x0)**2 + COEFFICIENT 4 |
| Ftrimaddd | r,y2t,3,r | # r = r * y2t[62:0] +COEFFICIENT 3<br># r = (((COEFFICIENT 7 .. + COEFFICIENT 4) * (x-x0)**2 + COEFFICIENT 3 |
| Ftrimaddd | r,y2t,2,r | # r = r * y2t[62:0] + COEFFICIENT 2<br># r = ((((COEFFICIENT 7 .. + COEFFICIENT 3) * (x-x0)**2 + COEFFICIENT 2 |
| Ftrimaddd | r,y2t,1,r | # r = r * y2t[62:0] + COEFFICIENT 1<br># r = (((((COEFFICIENT 7 .. + COEFFICIENT 2) * (x-x0)**2 + COEFFICIENT 1 |
| Ftrimaddd | r,y2t,0,r | # r = r * y2t[62:0] + COEFFICIENT 0<br># r = ((((((COEFFICIENT 7 .. + COEFFICIENT 1) * (x-x0)**2 + COEFFICIENT 0 |
| Fmuld | r,ys,r | # r = r * ys<br># r = ((((((((COEFFICIENT 7 .. + COEFFICIENT 1 ) * (x-x0)**2 + 1.0)<br>  * ((((qx%4)%2) ? 1.0 : (x-x0))^ (((qx%4)/2) << 63)) |
| Stdf | r,[] | # mem = r |

FIG. 14

$r = -1/15!$ $= (-1/15!)y^2 + 1/13!$ $= ((-1/15!)y^2 + 1/13!)y^2 - 1/11!$ $= (((-1/15!)y^2 + 1/13!)y^2 - 1/11!)y^2 + 1/9!$ $= ((((-1/15!)y^2 + 1/13!)y^2 - 1/11!)y^2 + 1/9!)y^2 - 1/7!$ $= (((((-1/15!)y^2 + 1/13!)y^2 - 1/11!)y^2 + 1/9!)y^2 - 1/7!)y^2 + 1/5!$ $= ((((((-1/15!)y^2 + 1/13!)y^2 - 1/11!)y^2 + 1/9!)y^2 - 1/7!)y^2 + 1/5!)y^2 - 1/3!$ $= (((((((-1/15!)y^2 + 1/13!)y^2 - 1/11!)y^2 + 1/9!)y^2 - 1/7!)y^2 + 1/5!)y^2 - 1/3!)y^2 + 1/1!$ $= ((((((((-1/15!)y^2 + 1/13!)y^2 - 1/11!)y^2 + 1/9!)y^2 - 1/7!)y^2 + 1/5!)y^2 - 1/3!)y^2 + 1/1!)$ $= (-1/15!)y^{14} + 1 \cdot 13! \: y^{12} + 1 \cdot 13! \: y^{10} + 1 \cdot 9! \: y^8 - 1/7! \: y^6 + 1 \cdot 5! \: y^4 - 1 \cdot 3! \: y^2 + 1/1!)$

FIG. 22 cos(x−x0)

| EXPANSION POINT OF TAYLOR SERIES | $x0 = \pi/2 * qx$ $qx = int(x/(\pi/2))$ | | |
|---|---|---|---|
| $bqx = qx\%4$ | EXPANSION FUNCTION | TAYLOR SERIES | |
| 00 | cos(x−x0) | $\Sigma(-1)^{**}n/(2*n)!*(x-x0)^{**}(2*n)$ | |
| 01 | −sin(x−x0) | $-\Sigma(-1)^{**}n/(2*n+1)!*(x-0)^{**}(2*n+1)$ | |
| 10 | −cos(x−x0) | $-\Sigma(-1)^{**}n/(2*n)!*(x-x0)^{**}(2*n)$ | |
| 11 | sin(x−x0) | $\Sigma(-1)^{**}n/(2*n+1)!*(x-x0)^{**}(2*n+1)$ | |

FIG. 23

Ftricmuld rs1, rs2, rd rd = (rs1 * rs1) | (~rs2[0] << 63)

Ftricseld rd = ((rs2[0]) ? rs1 : 1.0) ^ ((rs2[1] ^ rs2[0]) << 63))

| OPERATION CODE | OPERATION CONTENT |
|---|---|
| Ftricmuld y,bqx,y2t | # y2t = y2 \| (~bqx[0]<<63)<br># = (x-x0)2 \| ((((qx%4)%2) ^ 1) << 63) |
| Ftricseld y,bqx,ys | # ys = ((bqx[0]) ? y : 1.0)^((bqx[1]^bqx[0])<<63)<br># = (((qx%4)%2) ? (x-x0) : 1.0)<br># ^ ((((qx%4)/2) ^ ((qx%4)%2)) << 63) |

ARITHMETIC PROCESSING DEVICE AND CONTROL METHOD FOR ARITHMETIC PROCESSING DEVICE

CROSS-REFERENCE TO RELATED APPLICATION

This application is based upon and claims the benefit of priority of the prior Japanese Patent Application No. 2018-009607, filed on Jan. 24, 2018 the entire contents of which are incorporated herein by reference.

FIELD

The present invention relates to an arithmetic processing device and a control method for the arithmetic processing device.

BACKGROUND

An arithmetic processing device is constituted by a central processing unit (CPU) or a processor, for example, and includes an instruction decoder for decoding instructions, an arithmetic unit (an arithmetic circuit) for executing operations corresponding to the decoded instructions, a cache memory for storing a part of data stored in a main memory, and so on.

The arithmetic unit input and calculates data in input operands, and stores the calculation result in a storage register. Further, arithmetic unit input the calculation result again as an input operand, whereupon the arithmetic unit executes an identical or different operation thereon. Furthermore, the arithmetic unit has a pipeline structure in which the above operations are executed repeatedly at intervals of a predetermined clock period. This type of arithmetic unit is disclosed in Japanese Laid-open Patent Publication No. 2008-234076, Japanese Laid-open Patent Publication No. 2011-13728, and Japanese Laid-open Patent Publication No. 2009-169767.

Meanwhile, a mathematical function f (x) can be expressed by a Taylor series expansion, to be described below. In a Taylor series of a trigonometric function, an operation for determining a multiply-add value r by multiplying an input x by an initial value and adding a coefficient corresponding to a degree number to the multiplication value, and determining a new multiply-add value r by multiplying the multiply-add value r by the input x and adding a coefficient corresponding to the next degree number to the multiplication value is executed repeatedly.

Trigonometric functions sin (x) and cos (x) take identical values in a period of $2\pi$ of an angle input x. Further, sine sin (x) and cosine cos (x) take identical values when the inputs x thereof deviate from each other by $\pi/2$. With respect to sin (x), therefore, focusing on these properties, the arithmetic unit can calculate sin (x) using any Taylor series from sin (x−x0), −sin (x−x0), cos (x−x0), and −cos (x−x0) in accordance with an angle range, among angle ranges obtained by dividing a period of $2\pi$ into four equal parts, to which the input x belongs. Moreover, the Taylor series expansions of sin (x) and cos (x) are similar. Here, an expansion point x0 serves as a reference angle corresponding to the four equally divided angle ranges mentioned above.

An arithmetic processing device that performs operations with a high processing efficiency on the basis of these properties, using the Taylor series expansions of the trigonometric functions sin (x) and cos (x), has been proposed.

For example, an arithmetic processing device of this type is disclosed in Japanese Laid-open Patent Publication No. 2011-13728

This arithmetic processing device executes certain auxiliary processing on the input x in accordance with special auxiliary instructions, and then executes a multiply-add operation instruction for calculating a Taylor series using the value determined in the auxiliary processing. As described above, in response to an operation instruction of a Taylor series expansion, a multiply-add operation is executed repeatedly while extracting the coefficient of the Taylor series from a coefficient memory.

SUMMARY

However, the multiply-add operations instruction of the Taylor series can only be executed after completing the operation relating to the auxiliary instructions, and therefore a reduction in processing efficiency is unavoidable.

An arithmetic processing device comprising:
a register file;
a coefficient memory that stores coefficients of Taylor series expansions of trigonometric functions, which are selected by a coefficient index, and includes a coefficient selector (170) that outputs a coefficient selected in accordance with a coefficient selection signal;
a multiply-add arithmetic unit (100) that executes a multiply-add operation on first, second, and third inputs;
a first bypass path (BYP_1) on which an output of the multiply-add arithmetic unit is supplied to the register file;
first, second, and third multiplexers that select either the register file or the first bypass path and output data to the first, second, and third inputs of the multiply-add arithmetic unit;
an OR circuit (188) that calculates an OR of a sign bit of the output of the multiply-add arithmetic unit and a least significant bit (rs2 [0]=bqx [0]) of the second input;
a first selector (184) that selects either the first input or a value "1.0";
an EOR circuit (186) that calculates an EOR of a first bit (rs2 [1]=bqx [1]) of the second input and a sign bit of an output of the first selector; and
a second bypass path (BYP_2) on which the least significant bit (rs2 [0]=bqx [0]) of the second input of the multiply-add arithmetic unit is supplied to the coefficient selector,
wherein, when an operation of a trigonometric function sin (x) is executed, the arithmetic processing device:
calculating, in advance, expansion point identification data (bqx=qx % 4), which is a remainder (qx % 4) when an integer (qx) obtained by dividing an input x of the trigonometric function by $\pi/2$ is divided by 4, and y=x−x0, which is obtained by subtracting an expansion point x0 (bqx*$\pi/2$) from the input x, the expansion point x0 (bqx*$\pi/2$) being obtained by multiplying the expansion point identification data (bqx) by $\pi/2$,
executing a first auxiliary instruction having y and the expansion point identification data (bqx) as first and second inputs, respectively, and a first variable (y2t) as an output, wherein the multiply-add arithmetic unit determines a square value (y2t) by squaring the first input (y), the OR circuit determines an OR of a least significant bit (bqx [0]) of the expansion point identification data (bqx) that is the second input and a sign bit (y2t [63]) of the square value, and the OR is stored in the sign bit of the square value (y2t) to determine the first variable (y2t),
executing a second auxiliary instruction having y and the expansion point identification data (bqx) as first and second inputs, respectively, and a second variable (ys) as an output, wherein the first selector selects either the first input (y) or a value "1.0" on the basis of the least significant bit (bqx [0]) of the expansion point identification data, the EOR circuit determines an EOR of a sign bit ([63]) of the selected data and a first bit (bqx [1]) of the expansion point identification data, and the determined EOR is stored in the sign bit of the selected data to determine the second variable (ys), and repeatedly executing a third auxiliary instruction for executing a multiply-add operation having a previous operation output (r), the first variable (y2t), and the coefficient index as first, second, and third inputs, respectively, by the multiply-add arithmetic unit, while modifying the coefficient index from a maximum value to a minimum value, and multiplying an output of the repeatedly executed third auxiliary instruction by the second variable (ys) determined by the second auxiliary instruction to calculate the trigonometric function sin (x).

An arithmetic processing device comprising:
a register file;
a coefficient memory that stores coefficients of Taylor series expansions of trigonometric functions, which are selected by a coefficient index, and includes a coefficient selector (170) that outputs a coefficient selected in accordance with a coefficient selection signal;
a multiply-add arithmetic unit (100) that executes a multiply-add operation on first, second, and third inputs;
a first bypass path (BYP_1) on which an output of the multiply-add arithmetic unit is supplied to the register file;
first, second, and third multiplexers that select either the register file or the first bypass path and output data to the first, second, and third inputs of the multiply-add arithmetic unit;
an OR circuit (188) that calculates an OR of a sign bit of the output of the multiply-add arithmetic unit and an inverted least significant bit (~rs2 [0]=~bqx [0]) of the second input;
a first selector (184) that selects either the first input or a value "1.0";
a first EOR circuit (194) that calculates a first EOR of a least significant bit (rs[0]=bqx[0]) and a first bit (rs2[1]=bqx [1]) of the second output;
a second EOR circuit (186) that calculates a second EOR of the first EOR and a sign bit of an output of the first selector; and
a second bypass path (BYP_2) on which the inverted least significant bit (~rs2 [0]=~bqx [0]) of the second input of the multiply-add arithmetic unit is supplied to the coefficient selector,
wherein, when an operation of a trigonometric function cos (x) is executed, the arithmetic processing device:
calculating, in advance, expansion point identification data (bqx=qx % 4), which is a remainder (qx % 4) when an integer (qx) obtained by dividing an input x of the trigonometric function by π/2 is divided by 4, and y=x-x0, which is obtained by subtracting an expansion point x0 (bqx*π/2) from the input x, the expansion point x0 (bqx*π/2) being obtained by multiplying the expansion point identification data (bqx) by π/2,
executing a first auxiliary instruction having y and the expansion point identification data (bqx) as first and second inputs, respectively, and a first variable (y2t) as an output, wherein the multiply-add arithmetic unit determines a square value (y2t) by squaring the first input y, the OR circuit determines an OR of an inverted bit of a least significant bit (bqx [0]) of the expansion point identification data bqx and a sign bit (y2t [63]) of the square value, and the OR is stored in the sign bit of the square value (y2t) to determine the first variable (y2t), executing a second auxiliary instruction having y and the expansion point identification data (bqx) as first and second inputs, respectively, and a second variable (ys) as an output, wherein the first selector selects either the first input y or a value "1.0" on the basis of the least significant bit (bqx [0]) of the expansion point identification data, the first EOR circuit determines the first EOR of a least significant bit (bqx[0]) and a first bit (bqx[1]) of the expansion point identification data, the second EOR circuit determines the second EOR of the first EOR and a sign bit ([63]) of the selected data of the first selector, and the determined second EOR is stored in the sign bit of the selected data to determine the second variable (ys), and repeatedly executing a third auxiliary instruction for executing a multiply-add operation having a previous operation output (r), the first variable (y2t), and the coefficient index as first, second, and third inputs, respectively, by the multiply-add arithmetic unit, while modifying the coefficient index from a maximum value to a minimum value, and multiplying an output of the repeatedly executed third auxiliary instruction by the second variable (ys) determined by the second auxiliary instruction to calculate the trigonometric function cos (x).

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a view illustrating an arithmetic expression obtained when the Taylor series of sine sin (y) and cosine cos (y) are expanded on the basis of the arithmetic expression illustrated in FIG. 3.

FIG. 6 is a table summarizing relationships between the least significant two bits of the expansion point identification data bqx=qx % 4 and the function to be expanded together with the Taylor series expansion thereof.

FIG. 7 is a table illustrating results obtained by deforming the four Taylor series expansions illustrated in FIG. 6.

FIG. 8 is a table illustrating assembler descriptions of the first and second auxiliary instructions Ftrismuld, Ftrisseld and specific examples of cases in which these instructions are applied to the trigonometric function sin (x).

FIG. 11 is a table illustrating assembler descriptions of the Taylor series multiply-add operation instruction Ftrimaddd and the multiply instruction Fmuld, and specific examples of cases in which these instructions are applied to the trigonometric functions sin (x), cos (x).

FIG. 12 is a table illustrating operation code based on the assembler descriptions of pre-processing of the Taylor series expansion operation of the trigonometric function sin (x), and the operation content thereof.

FIG. 13 is a relationship diagram illustrating a relationship between operation codes based on the assembler descriptions of the post-processing and the operation content thereof.

FIG. 14 is a view illustrating a specific arithmetic expression of sin (x) in the operation of FIG. 13.

FIG. 22 is a table summarizing relationships between the least significant two bits of bqx=qx % 4 and the function to be expanded, as well as the Taylor series expansion thereof, in the case of the trigonometric function cos (x).

FIG. 23 is a table illustrating assembler descriptions of auxiliary instructions Ftricmuld, Ftricseld of the pre-processing in the case of the trigonometric function cos (x) and specific examples of cases in which the instructions are applied to the trigonometric function cos (x).

DESCRIPTION OF EMBODIMENTS

Outline of Arithmetic Processing Device

Figure 1:
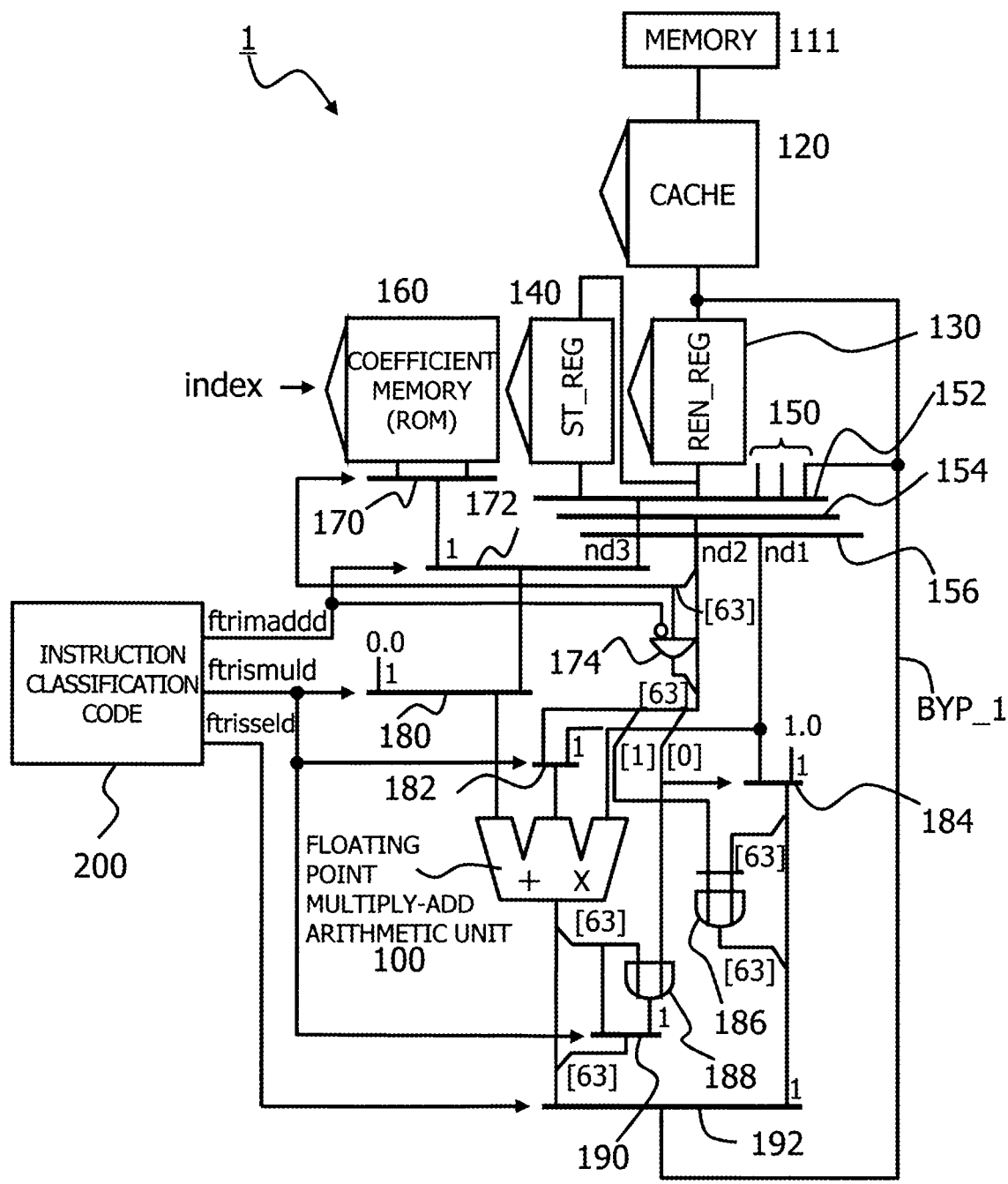
FIG. 1 is a view illustrating an outline of an arithmetic processing device.

FIG. 1 is a view illustrating an outline of an arithmetic processing device. The arithmetic processing device is configured to execute the auxiliary instructions described above. First, to describe the configuration briefly, an arithmetic processing device 1 includes a multiply-add arithmetic unit 100, a renaming register 130 for temporarily storing an operation result obtained by the multiply-add arithmetic unit, and a storage register 140 for storing the operation results stored in the renaming register 130 in turn. These registers constitute a register file having a plurality of registers and will be referred to simply as the register hereafter. Further, data read from a cache 120 having a cache memory for storing a part of data stored in an external main memory 111 are stored in the renaming register 130 or the storage register 140.

The arithmetic processing device 1 further includes a first multiplexer 156 for inputting first input data into a first operand register of the multiply-add arithmetic unit 100, a second multiplexer 154 for inputting second input data into a second operand register, and a third multiplexer 152 for inputting third input data into a third operand register. These multiplexers 152, 154, 156 serve as selectors for selecting any one of the renaming register 130, the storage register 140, and one of a plurality of bypass routes 150 including a bypass route BYP_1. In FIG. 1, input terminals of the multiplexers have been partially omitted from the figure, but output nodes nd1, nd2, nd3 are illustrated.

Further, in order to execute a Taylor series operation, the arithmetic processing device 1 includes a coefficient memory (a read only memory: ROM) 160 storing Taylor series coefficients. A coefficient selected by a selector 170 from among two coefficients selected by an index index is selected by selectors 172, 180 and input into the third operand register of the multiply-add arithmetic unit 100.

The multiply-add arithmetic unit 100 performs a double-precision floating point operation, for example. In the case of double precision, the data width is 64 bits. Note, however, that this embodiment may also be applied to a multiply-add arithmetic unit 100 that performs a floating point operation of a precision other than double precision. In the case of single precision, for example, the data width is 32 bits.

The arithmetic processing device 1 of FIG. 1 executes the first and second auxiliary instructions Ftrismuld and Ftrisseld described above, and executes a multiply-add operation instruction Ftrimaddd for calculating a Taylor series expansion. The multiply-add operation instruction also serves as a third auxiliary instruction for calculating a Taylor series expansion. The processing content of these instructions will be described in detail below, but in order to execute the two auxiliary instructions and the multiply-add operation instruction, the arithmetic processing device 1 includes a special configuration in addition to the multiply-add arithmetic unit 100.

For example, when the first auxiliary instruction Ftrismuld is executed, the selectors 180, 182, 190 are respectively controlled to select the input terminal on the "1" side. An OR circuit 188 serves as a sign processing circuit for Ftrismuld that replaces the most significant bit [63] serving as the sign bit of the operation output of the multiply-add arithmetic unit 100 with a selected bit serving as a set number of the coefficient memory 160. The selected bit serving as the set number is the least significant bit [0] of the node nd2. See FIGS. 2 and 9.

Further, when the second auxiliary instruction Ftrisseld is executed, the selector 192 is controlled to select the input terminal on the "1" side. Furthermore, a selector 184 selects either the node nd1 (a first input) or a value "1.0" on the basis of the selected bit serving as the set number, and an EOR gate 186 inverts the most significant bit [63] serving as the sign bit of the output of the selector 184 by the first bit [1] of the node nd2 (a second input). See FIG. 10.

When the Taylor series multiply-add operation instruction Ftrimaddd is executed, meanwhile, the selector 172 is controlled to select the input on the "1" side. As a result, a coefficient extracted from the coefficient memory 160 is input into the third operand register of the multiply-add arithmetic unit 100. Further, the data in the output nodes nd2, nd1 of the multiplexers 154, 156 are input respectively into the second and first operand registers of the multiply-add arithmetic unit 100.

The operation result obtained by the multiply-add arithmetic unit 100 is then input into a first input operand of the multiply-add arithmetic unit 100 via the first bypass route BYP_1. Simultaneously, a coefficient newly extracted from the coefficient memory and the data calculated in response to the first auxiliary instruction Ftrismuld are input respectively into the third and second input operands of the multiply-add arithmetic unit 100. Thus, the multiply-add arithmetic unit 100 performs a multiply-add operation using the result of the multiply-add operation of the previous cycle, a coefficient, and the data calculated in response to the first auxiliary instruction. By executing this multiply-add operation repeatedly, a Taylor series expansion is calculated.

Figure 2:
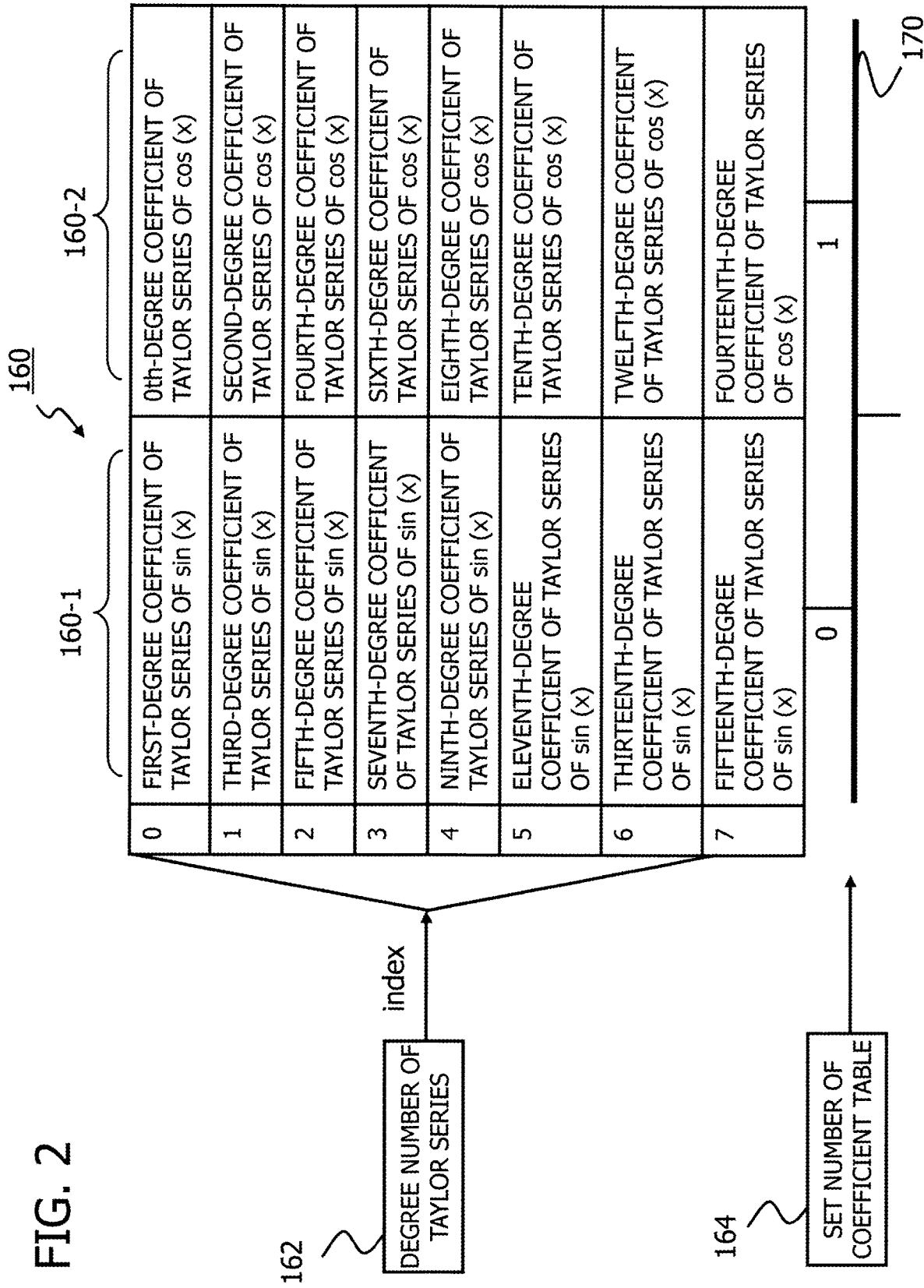
FIG. 2 is a view illustrating respective configurations of the coefficient memory 160 and the selector 170.

FIG. 2 is a view illustrating respective configurations of the coefficient memory 160 and the selector 170. The coefficient memory 160 stores coefficients of the Taylor series of sine sin (x) and cosine cos (x). The coefficients of the Taylor series of sine sin (x) and cosine cos (x) is now described.

Figure 3:
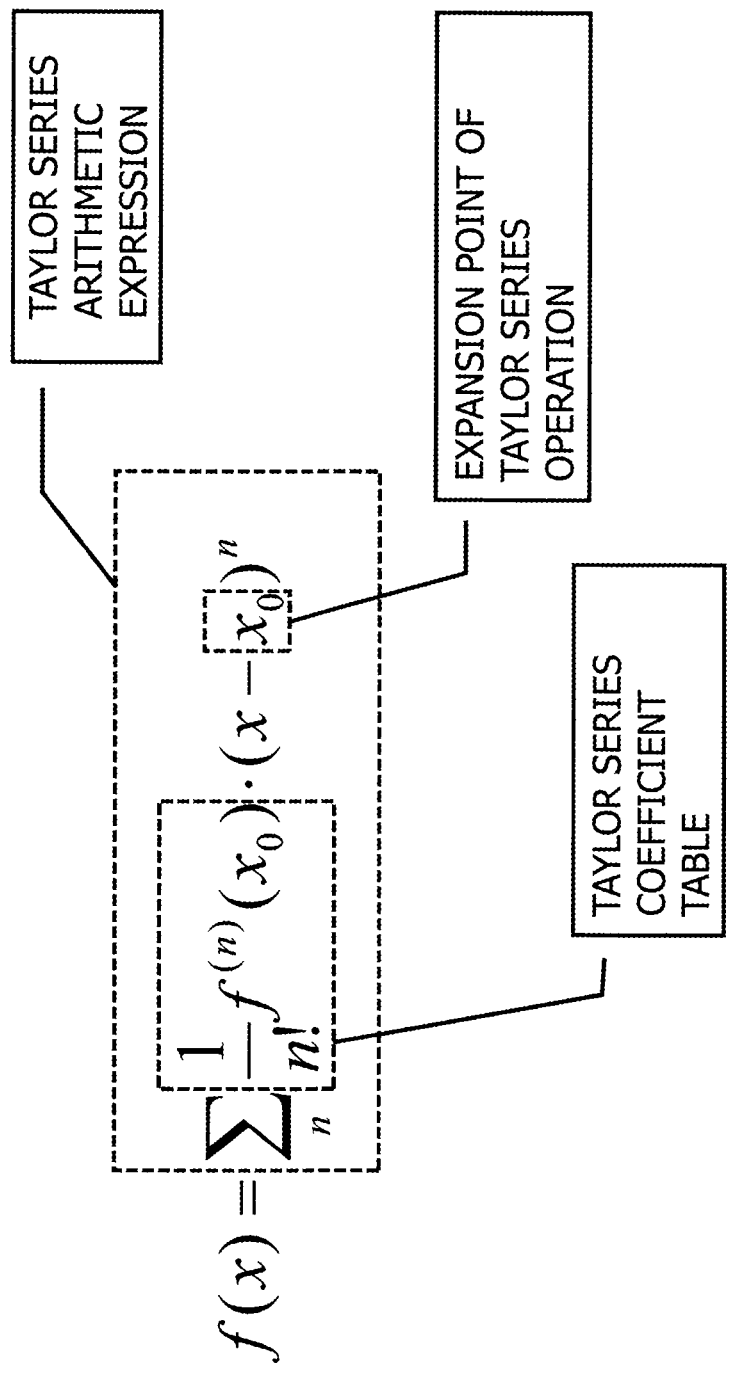
FIG. 3 is a view illustrating an arithmetic expression of a Taylor series.

FIG. 3 is a view illustrating an arithmetic expression of a Taylor series. A mathematical function f (x) can be expressed using the Taylor series expansion illustrated in FIG. 3. In other words, in the arithmetic expression of a Taylor series, an expansion point x0 in relation to an input x is determined, a series $(x-x0)^n$ is multiplied by a coefficient $(1/n!) f^{(n)}(x0)$, and the multiplied result is expanded into a series for n.

FIG. 4 is a view illustrating an arithmetic expression obtained when the Taylor series of sine sin (y) and cosine cos (y) are expanded on the basis of the arithmetic expression illustrated in FIG. 3. Here, y corresponds to y=x-x0, wherein the input is x and the expansion point is x0. And, n=0~7. As illustrated in FIG. 4, sin (y) is an odd number function while cos (y) is an even number function, and the respective coefficients thereof are also different.

Hence, the coefficient memory 160 illustrated in FIG. 2 is configured such that an odd-degree coefficient and an even-degree coefficient in a row direction for sin (y) (sin (x) in FIG. 2) and cos (y) (cos (x) in FIG. 2), respectively, are selected by an index index of a degree number 162 of the Taylor series, and the selector 170 selects the coefficient of either sin or cos in accordance with a set number 164 for selecting sin and cos. As illustrated in FIG. 1, therefore, when an operation is performed using a Taylor series expansion, coefficients corresponding to the respective degrees are selected by the index index that serves as the argument of the multiply-add operation instruction Ftrimaddd, whereupon the selector 170 selects the coefficient of either sin or cos on the basis of the selected bit serving as the set number.

Taylor Series Expansions of Trigonometric Functions, the Two Auxiliary Operations Ftrismuld, Ftrisseld Described Above, the Taylor Series Multiply-add Operation Instruction Ftrimaddd, and a Multiply Instruction Fmuld Next, a Taylor series expansion of a trigonometric function, the two auxiliary operations Ftrismuld, Ftrisseld described above, the Taylor series multiply-add operation instruction Ftrimaddd, and a multiply instruction Fmuld will be described. The Taylor series expansion of a mathematical function f (x) was described in FIG. 3, and Taylor series expansions of trigonometric functions sin (y), cos (y) were described in FIG. 4.

Figure 5:
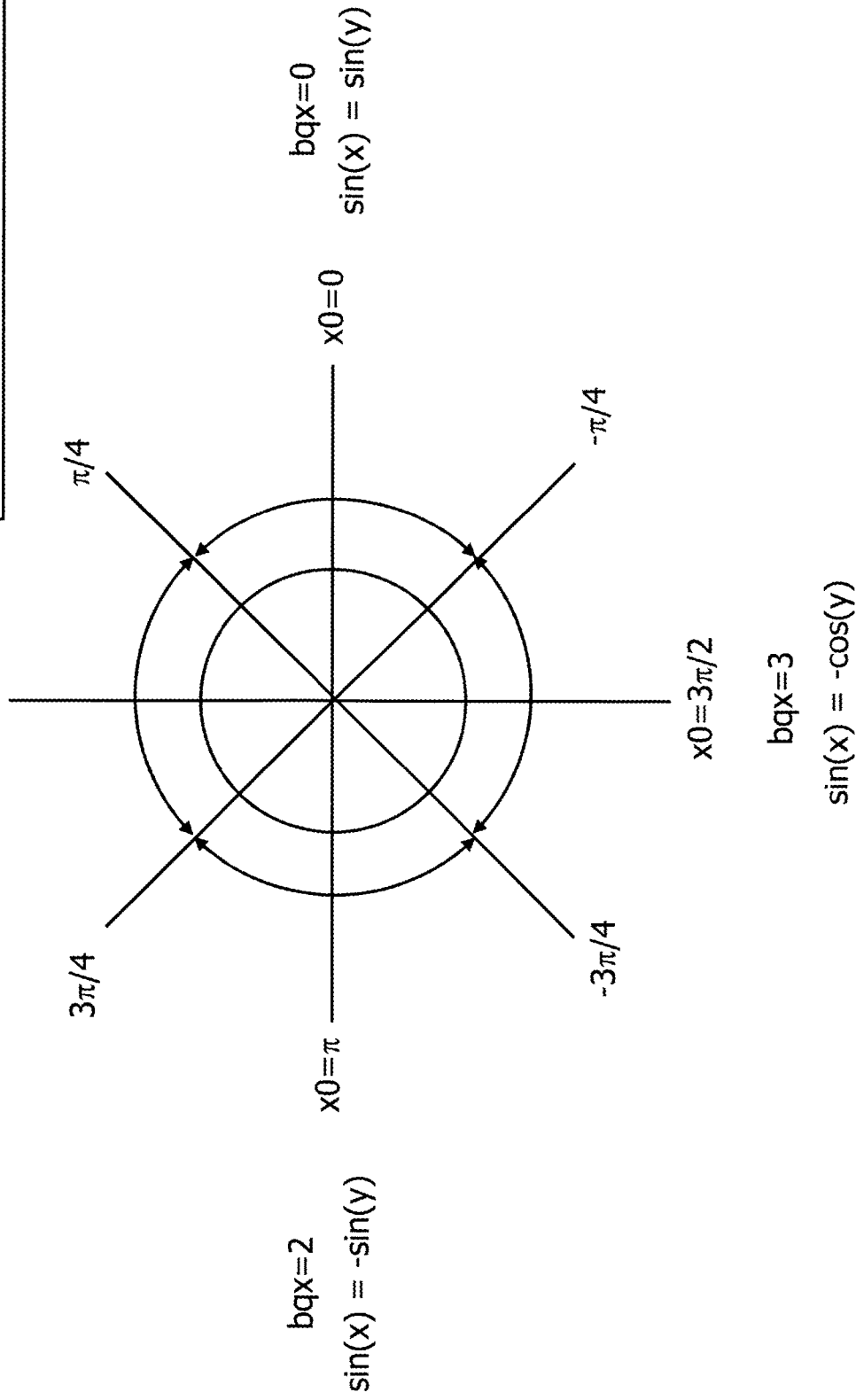
FIG. 5 is a view illustrating a relationship between the expansion point x0 and sin (y)=sin (x−x0) with respect to the trigonometric function sin (x).

FIG. 5 is a view illustrating a relationship between the expansion point x0 and sin (y)=sin (x-x0) with respect to the trigonometric function sin (x). The trigonometric function sin (x) is a value obtained in relation to an input x of $-\infty<x<+\infty$, but sin (x) takes an identical value at a period of $2\pi$ of the input x. Therefore, by selecting any expansion point x0 that increases in increments of $\pi/2$ from 0 relative to the input x, i.e. x0=0, $\pi/2$, $\pi$, $3\pi/2$ . . . , the following relationships are satisfied. The reason for this is that sin (x) and cos (x) become equal when x deviates by $\pi/2$.

(1) When x0=0, $2\pi$, $4\pi$ . . . , sin (x)=sin (x-x0)=sin (y)

(2) When x0=0+$\pi/2$, $2\pi$+$\pi/2$, $4\pi$+$\pi/2$ . . . , sin (x)=cos (x-x0)=cos (y)

(3) When x0=0+$\pi$, $2\pi$+$\pi$, $4\pi$+$\pi$ . . . , sin (x)=-sin (x-x0)=-sin (y)

(4) When x0=0+$3\pi/2$, $2\pi$+$3\pi/2$, $4\pi$+$3\pi/2$ . . . , sin (x)=-cos (x-x0)=-cos (y)

Hence, when the input x is within a range of $\pm\pi/4$ of the four expansion points x0 described above so as to be within (2qx-1) $\pi/4<x\leq$(2qx+1) $\pi/4$ (where qx is an integer), the respective values of sin (x) can be calculated as follows.

(1) In a range $-\pi/4<x\leq+\pi/4$ (where qx=4N and N is an integer), x0=0 etc., and sin (x)=sin (x-x0)=sin (y)

(2) In a range +$\pi/4<x\leq+3\pi/4$ (where qx=4N+1), x0=$\pi/2$ etc., and sin (x)=cos (x-x0)=cos (y)

(3) In a range +$3\pi/4<x\leq+5\pi/4$ (or $-5\pi/4<y=x-x0\leq-3\pi/4$) (where qx=4N+2), x0=$\pi$ or $-\pi$ etc., and sin (x)=-sin (x-x0)=-sin (y)

(4) In a range $-3\pi/4<x\leq-\pi/4$ (where qx=4N+3), x0=$3\pi/2$ or $-\pi/2$ etc., and sin (x)=-cos (x-x0)=-cos (y)

By dividing the input x into the four narrow ranges at the four expansion points x0 (=0, $\pi/2$, $\pi$, $3\pi/2$ . . . ) in this manner, the value of the trigonometric function sin (x) in relation to the input x in each range can be obtained with a high degree of precision by only expanding the Taylor series up to a lower degree.

The four ranges and the four expansion points x0 can be distinguished by bqx=0, 1, 2, 3, which are calculated from the input x in the following manner. This calculation is illustrated on the upper right side of FIG. 5.

qx=int (x/($\pi/2$)): int (k) is an integer obtained by rounding k down to the nearest decimal bqx=qx mod 4=qx % 4: mod, % denote remainders Since x0=qx*$\pi/2$, $$y=x-x0=x-(qx*\pi/2)$$

Hence, bqx, and more specifically the least significant two bits bqx [1:0] thereof, will be defined hereafter as expansion point identification data.

FIG. 6 is a table summarizing relationships between the least significant two bits of the expansion point identification data bqx=qx % 4 and the function to be expanded together with the Taylor series expansion thereof. The expansion point identification data bqx are the remainder of bq relative to 4, and therefore, in binary, the least significant two bits are bqx [1:0]=00, 01, 10, 11. Further, in FIG. 6, ** and ! denote the power and the factorial, respectively.

FIG. 7 is a table illustrating results obtained by deforming the four Taylor series expansions illustrated in FIG. 6. In FIG. 7, expansions of the respective functions sin (y), cos (y), -sin (y), -cos (y) of the expansion point identification data bqx [1:0] (=qx % 4)=00, 01, 10, 11 are described. The Taylor series expansion of the sin function is expressed by an odd functional expression $(y^{(2n+1)})$ of y (=x-x0). The Taylor series expansion of the cos function, meanwhile, is expressed by an even functional expression $(y^{2n})$ of y (=x-x0). Hence, a commonality exists within the parentheses of the respective expansions in the form of a polynomial $(y^0-a3\pi y^2+ \ldots -a15 \cdot y^{14})$ of an even function obtained by multiplying $y^0$ and $y^2 \ldots y^{14}$ by the coefficients of sin and cos (a3 to a15 and b2 to b14) respectively. Outside the parentheses, meanwhile, the following differences exist.

(1) In the case of sin (y), i.e. when bqx [1:0]=00, the polynomial in parentheses is multiplied by y (2) In the case of cos (y), i.e. when bqx [1:0]=01, the polynomial in parentheses is multiplied by 1.0

(3) In the case of -sin (y), i.e. when bqx [1:0]=10, the polynomial in parentheses is multiplied by (-y)

(4) In the case of -cos (y), i.e. when bqx [1:0]=11, the polynomial in parentheses is multiplied by (-1.0)

Hence, when calculating the trigonometric function sin (x), the arithmetic processing device illustrated in FIG. 1 firstly calculates the expansion point identification data bqx from the input x, and secondly calculates the series parts (the parts in parentheses in FIG. 7) of the Taylor series by repeatedly executing the Taylor series multiply-add operation instruction Ftrimaddd, to be described below, from the values of the two bits of bqx [1:0], the values of y=x−x0 and $y^2=(x-x0)^2$, and the Taylor series coefficients (a3 to a15 and b2 to b14) of sin and cos. Thirdly, the arithmetic processing device executes the multiply instruction Fmuld, thereby performing a calculation to multiply the aforesaid series parts by one of y, 1.0, −y, and −1.0.

Accordingly, the coefficients used to calculate the series parts by repeated execution of the second multiply-add operation instruction Ftrimaddd and the multipliers used to execute the third multiply instruction Fmuld are as follows.
(1) When bqx [1:0]=00, the coefficient of sin (x) and the multiplier y are used
(2) When bqx [1:0]=01, the coefficient of cos (x) and the multiplier 1.0 are used
(3) When bqx [1:0]=10, the coefficient of sin (x) and the multiplier −y are used
(4) When bqx [1:0]=11, the coefficient of cos (x) and the multiplier −1.0 are used Next, the auxiliary instructions for determining the trigonometric function sin (x), namely the Taylor series multiply-add operation instruction Ftrimaddd, the first auxiliary instruction Ftrismuld for selecting a coefficient from the coefficient memory and determining the initial value $y^2$ of the multiply-add operation instruction Ftrimaddd, and the second auxiliary instruction Ftrisseld for determining the final-stage coefficients (y, 1.0, −y, −1.0), will be described.

First Auxiliary Instruction Ftrismuld

FIG. 8 is a table illustrating assembler descriptions of the first and second auxiliary instructions Ftrismuld, Ftrisseld and specific examples of cases in which these instructions are applied to the trigonometric function sin (x).

First, the assembler descriptions of the first auxiliary instruction Ftrismuld are as follows.
Ftrismuld rs1 rs2 rd
Further, the processing content is as follows.

$$rd=(rs1*rs1)|(rs2[0]<<63)$$

In other words, the processing content includes squaring the value of a register (a double-precision floating point register, for example) specified by rs1 and storing the result of setting the least significant bit rs2 [0] of the register specified by rs2 as the sign bit [63] in a register specified by rd.

An example of the auxiliary instruction Ftrismuld used to calculate the trigonometric function sin (x) and the processing content thereof are as follows.
Ftrismuld y, bqx, y2t $$rd=(y*y)|(bqx[0]<<63)$$

More specifically, the processing content includes calculating $y^2$ and replacing the sign bit serving as the most significant bit thereof with the least significant bit bqx [0] of the expansion point identification data bqx. Since $y^2$ is positive, the processing for replacing the sign bit with the least significant bit bqx [0] of bqx may be an OR operation executed on the sign bit (positive) of $y^2$ and bqx [0].

Figure 9:
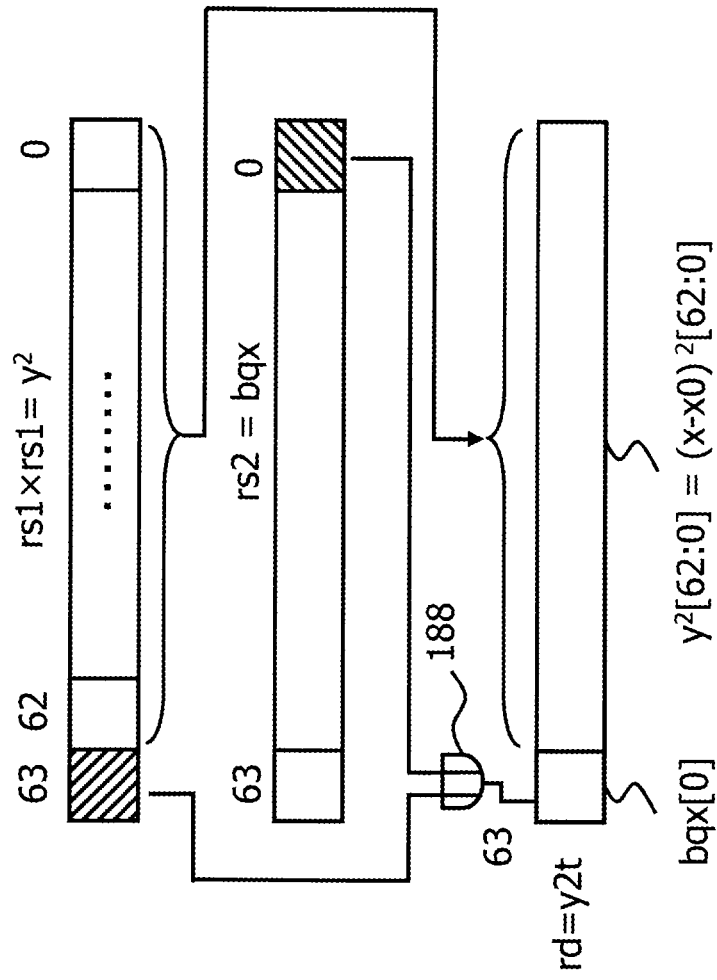
FIG. 9 is a view illustrating the processing content of the first auxiliary instruction Ftrismuld.

FIG. 9 is a view illustrating the processing content of the first auxiliary instruction Ftrismuld. FIG. 9 illustrates an example of a double-precision floating point, and therefore each register is 64 bits [63:0], with the most significant bit [63] serving as the sign bit. Note, however, that this embodiment may also be applied to a floating point of a precision other than double precision, and in the case of single precision, for example, the most significant bit [31] serves as the sign bit.

y=(x−x0) is stored in the register rs1, the expansion point identification data bqx are stored in the register rs2, and the register rd is a register of a variable y2t. The sign bit [63] (which is always positive) of the square of the value y in the register rs1, i.e. $rs1*rs1=y^2=(x-x0)^2$, and the least significant bit bqx [0] of the expansion point identification data bqx in the register rs2 are input into an OR gate 188, the least significant bit bqx [0] of bqx is output from the OR gate 188 and stored in the sign bit [63] of the register rd, and the [62:0] bits of $rs1*rs1=y^2=(x-x0)^2$ are stored in [62:0] of rd, excluding the sign bit.

When executing the Taylor series multiply-add operation instruction Ftrimaddd, the two pieces of information in the register rd, namely bqx [0] and [62:0] of $y^2=(x-x0)^2$, are used respectively as the selected bit of the coefficient set (the selected bit of the coefficient of sin or cos) and the initial value $y^2=(x-x0)^2$ of the multiply-add operation instruction.

Second Auxiliary Instruction Ftrisseld

As illustrated in FIG. 8, the assembler descriptions of the second auxiliary instruction Ftrisseld are as follows.
Ftrisseld rs1, rs2, rd
Further, the processing content is as follows.

$$rd=((rs2[0]?1.0:rs1)\verb|^|(rs2[1]<<63)$$

In other words, the processing content includes selecting either the value in the register specified by rs1 or 1.0 based on the least significant bit rs2 [0] of the value in the register specified by rs2, obtaining the EOR of the sign bit of this value and the bit 1, of the value in the rs2 register, i.e. rs2 [1], and storing the obtained EOR in the register specified by rd. ^ denotes an Exclusive OR (EOR).

An example of the auxiliary instruction Ftrisseld used to calculate the trigonometric function sin (x) and the processing content thereof are as follows.
Ftrisseld y, bqx, ys $$rd=((bqx[0]?1.0:y)\verb|^|(bqx[1]<<63)$$

More specifically, the processing content includes selecting the input y when bqx [0]=0 and selecting 1.0 when bqx [0]=1, obtaining the EOR of the sign bit of the selected value and bqx [1], and storing the obtained EOR in the register specified by rd. In other words, when bqx [1]=1, the sign bit of the selected value (y or 1.0) is inverted in accordance with the EOR.

Figure 10:
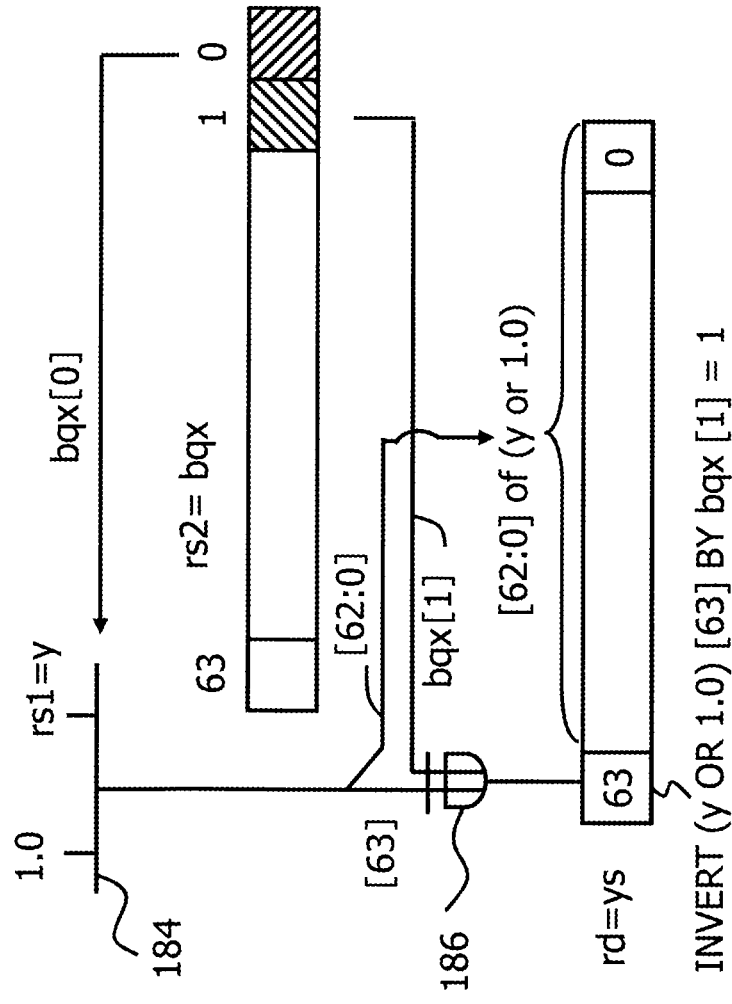
FIG. 10 is a view illustrating the processing content of the second auxiliary instruction Ftrisseld.

FIG. 10 is a view illustrating the processing content of the second auxiliary instruction Ftrisseld. Likewise in this case, an example of a double-precision floating point is illustrated, but this embodiment may also be applied to a floating point of a precision other than double precision.

y=(x−x0) is stored in the register rs1, the expansion point identification data bqx are stored in the register rs2, and the register rd is a register of a variable ys. The selector 184 selects the input y when bqx [0]=0 and 1.0 when bqx [0]=1. Further, the EOR gate 186 outputs the EOR of the sign bit [63] of the selected value (y or 1.0) and bqx [1], whereupon the output of the EOR 186 is stored in the sign bit [63] of the register of the variable ys and the [62:0] bits of the selected value are stored in [62:0] of the register of the variable ys. The variable ys is y, 1.0, −y, or −1.0 in accordance with bqx [0] and bqx [1].

The variable ys (=y, 1.0, −y, −1.0) calculated by this processing is then multiplied by the operation result (the parentheses in FIG. 7) of the multiply-add operation instruction Ftrimaddd in accordance with the multiply instruction Fmuld, to be described below.

Multiply-Add Operation Instruction Ftrimaddd of Taylor Series Expansion

FIG. 11 is a table illustrating assembler descriptions of the Taylor series multiply-add operation instruction Ftrimaddd and the multiply instruction Fmuld, and specific examples of cases in which these instructions are applied to the trigonometric functions sin (x), cos (x).

First, the assembler descriptions of the multiply-add operation instruction Ftrimaddd serving as the third auxiliary instruction are as follows.

Ftrimaddd rs1, rs2, index, rd

Further, the processing content is as follows.

$$rd=rs1*Fabs(rs2)+T[rs2[63]][index]$$

In other words, the processing content includes multiplying the absolute value of the value in a double-precision floating point register specified by rs2 by the value in a double-precision floating point register specified by rs1, adding thereto a double-precision number extracted by index and the set number 164 from a table memory in the arithmetic unit, and storing the result in a double-precision floating point register specified by rd. Ftrimaddd calculates the series parts of sin (x) and cos (x).

Next, FIG. 11 illustrates two examples, namely example 1 and example 2, of cases in which the multiply-add operation instruction Ftrimaddd serving as the third auxiliary instruction is applied to calculation of the series parts of sin (x) and cos (x). The series parts of sin (x) and cos (x) are calculated by executing the third auxiliary instruction Ftrimaddd repeatedly a plurality of times. Example 1 illustrates the initial operation and example 2 illustrates the operation performed from the second time onward. The operation instructions and processing content of the two examples are as follows.

Example 1

Ftrimaddd c0, y2t, 7, r $$r=c0*Fabs(y2t)+T[y^2t[63]][7]$$

More specifically, since the function Fabs denotes an absolute value, the processing content includes multiplying a constant c0=0.0 by the absolute value of the variable $y2t=y^2$, adding thereto a coefficient selected by index=7 (the degree number 162 in FIG. 2) of the table T and y2t [63]=bqx [0] (the set number 164 in FIG. 2), and storing the result in the register of the variable r. In the case of sin (x), y2t [63]=bqx [0]=0, and therefore the fifteenth degree coefficient of the Taylor series of sin (x) in the coefficient memory 160 in FIG. 2 is selected as T [y2t [63]] [7].

Example 2

Ftrimaddd r, y2t, index, r (index=6 to 0)

$$r=r*Fabs(y2t)+T[y2t[63]][index]$$

More specifically, the processing content includes multiplying a previous processing result r by the absolute value of the variable $y2t=y^2$, adding thereto a coefficient selected by index (the degree number 162 in FIG. 2) of the table T and y2t [63]=bqx [0] (the set number 164 in FIG. 2) from the table T, and storing the result in the register of the variable r. In the case of sin (x), y2t [63]=0, and therefore the coefficient of the Taylor series that corresponds to index (=6~0) of sin (x) in the coefficient memory 160 in FIG. 2 is selected as T [y2t [63]] [index].

Multiply Instruction Fmuld

Next, the assembler descriptions of the multiply instruction Fmuld serving as a fourth auxiliary instruction are as follows.

Fmuld rs1, rs2, rd

Further, the processing content is as follows.

$$rd=rs1*rs2$$

In other words, the processing content includes multiplying the value of the double-precision floating point register specified by rs1 by the value of the double-precision floating point register specified by rs2 and storing the result in the double-precision floating point register specified by rd.

Next, an example of a case in which the auxiliary instruction Fmuld is applied to calculation of the series parts of sin (x) and cos (x) is as follows.

Fmuld r, ys, r $$r=r*ys$$

In other words, in this processing, the operation result r of the third auxiliary instruction Ftrimaddd is multiplied by the operation result ys (=y, 1.0, −y, −1.0) of the second auxiliary instruction Ftrisseld, and the result is stored in the register of the variable r.

Pre-Processing of Taylor Series Expansion Operation of Trigonometric Function Sin (x)

FIG. 12 is a table illustrating operation code based on the assembler descriptions of pre-processing of the Taylor series expansion operation of the trigonometric function sin (x), and the operation content thereof. The pre-processing will now be described specifically, with additional reference to the arithmetic unit configuration illustrated in FIG. 1.

In response to a load instruction Iddf, an input argument mem in the memory is loaded to x.

Next, bqx=((x*rp2)+bg) is calculated in response to a multiply-add instruction Fmaddd (a floating multiply add double). Here, 1/(π/2) is set in a register rp2 (the node nd2), and a value "1.5*252" is set in a register bg. In response to this instruction, the floating point multiply-add arithmetic unit 100 calculates the product of x in the register file 140** and rp2, and the sum of this product and bg.

Thus, a value qx=int (x/(π/2)) by which the expansion function and the sign are determined is obtained in the lower 51 bits of the mantissa part of the operation result bqx. Further, the reason for adding the value "1.5*2**52" is that by adding a value of the $52^{nd}$ power, the decimals are rounded off. In other words, rounding processing is executed.

Next, qx=bqx−bg is calculated in response to a difference instruction Fsubd (a floating subtract double). In response to this instruction, the floating point multiply-add arithmetic unit 100 calculates a difference qx by subtracting bg from bqx in the register file 140. By adding and subtracting bg in this manner, the decimals are rounded off.

Next, y=x−(qx*p2a) is calculated (where p2a=π/2) in response to a multiply-add instruction Fnmsubd (a floating negative multiply subtract double). The higher order value of "π/2" is set in the register p2a. In response to this instruction, the floating point multiply-add arithmetic unit 100 calculates the product of qx in the register file 140 and p2a, stores the result in the register, and then reads this product and x and calculates the difference therebetween.

Next, y=x−(qx*p2a) is calculated in response to the multiply-add instruction Fnmsubd. The lower order value of "π/2" is set in a register p2b. In response to this instruction, the floating point multiply-add arithmetic unit 100 calculates the product of qx in the register file 140 and p2b, stores the result in the register, and then reads this product and y and calculates the difference therebetween. As a result, y=(x−x0) of the Taylor series operation is obtained. The reason why two multiply-add instructions are used is that the value of π/2 is divided into a higher order bit and a lower order bit for the calculation in order to increase the accuracy of the decimals.

Next, the first auxiliary instruction Ftrismuld of the trigonometric function operation is calculated. More specifically, in response to "ftrismuld" from the instruction classification code 200 (FIG. 1), the selector 182, which normally selects the register rs2 (the node nd2), is switched to the "1" side so that the register rs1 (the node nd1) is output from the selector 182. As a result, the floating point multiply-add arithmetic unit 100 squares the value y in the register rs1 (the node nd1). The OR circuit 188 input the data rs2 [0]=bqx [0] in the $0^{th}$ bit of the register rs2 (the node nd2), and the sign bit, i.e. the $63^{rd}$ bit, of the output $y^2$ from the arithmetic unit 100, $y^2$ [63]. Since $y^2>0$, $y^2$ [63]=1, the OR circuit 188 output bqx[0]. The output (=rs2 [0]=bqx [0]) of the OR circuit 188 is output to the sign bit [63] of the output $y^2$ of the arithmetic unit 100 via the selector 190. Note that the selector 180 selects the input 0.0 of the "1" side and inputs the selected input 0.0 into an add operand of the multiply-add arithmetic unit 100. The multiply-add arithmetic unit 100 simply squares the input y of the register rs1, and therefore the added value may be set at 0.0.

In other words, as illustrated in FIG. 9, in the register of the variable y2t, $y^2$ is stored in [62:0] and the least significant bit bqx [0] of the expansion point identification data bqx is stored in the sign bit [63].

Next, the second auxiliary instruction Ftrisseld of the trigonometric function operation is calculated. In FIG. 1, the selector 184, into which the value "1.0" (64 bits) and the data y (64 bits) in the register rs1 (nd1) are input, selects the value "1.0" when bqx [0]=1 and selects the data y when bqx [0]=0 on the basis of the value rs2 [0]=bqx [0] of the $0^{th}$ bit of the register rs2 (the node nd2). The EOR circuit 186 then calculates the EOR of the value in the $63^{rd}$ bit of the output of the selector 184 and the value of register rs2 [1]=bqx [1], replaces the $63^{rd}$ bit of the output of the selector 184 with the EOR operation result, and stores the result in an output register rd=ys via the selector 192.

The $63^{rd}$ bit of the output ys denotes the sign (+ or −) of the Taylor series expansion function, while the [62:0] bits denote y=(x−x0) or 1.0, i.e. the output of the selector 184.

Hence, by providing the auxiliary instructions Ftrismuld and Ftrisseld of the trigonometric function operation and the selectors 180, 182, 184, 190, 192, the EOR circuit 186, and the OR circuit 188, which are operated in response to these instructions, the finally multiplied values "y" and "1.0" of the Taylor series operation can be determined in addition to the Taylor series expansion function using a smaller number of instructions. As a result, the speed of the pre-processing can be increased.

Post-Processing of Taylor Series Expansion Operation of Trigonometric Function Sin (x)

Next, post-processing using the third auxiliary instruction Ftrimalddd and the fourth auxiliary instruction Fmuld of the trigonometric function operation will be described. By executing the third auxiliary instruction Ftrimalddd repeatedly, the speed of the Taylor expansion operation of the trigonometric function sin (x) can be increased.

FIG. 13 is a relationship diagram illustrating a relationship between operation codes based on the assembler descriptions of the post-processing and the operation content thereof. FIG. 14 is a view illustrating a specific arithmetic expression of sin (x) in the operation of FIG. 13. As illustrated in FIG. 14, the operation sequence is set such that the coefficient having the highest degree is calculated first, whereupon the operation result is multiplied by y2s=$y^2$ and the coefficient having the next highest degree is added thereto sequentially. More specifically, first, the coefficient (1/15!) having the highest degree ($15^{th}$) of the Taylor expansion is called up from the coefficient memory 160, and then, in accordance with the third auxiliary instruction Ftrimaddd of the trigonometric function operation, the multiply-add operation ((coefficient of preceding degree*$y^2$)+coefficient of current degree) is executed repeatedly.

The operation processing of FIG. 13 will now be described specifically with reference to the configurations illustrated in FIGS. 1 and 2. The operations of examples 1 and 2 illustrated in FIG. 11 are executed in response to the third auxiliary instruction Ftrimaddd.

An initial auxiliary instruction Ftrimaddd c0, y2t, 7, r corresponds to example 1, in which the following operation is executed.

$$r=0.0*y2t[62:0]+\text{coefficient } 7=\text{coefficient } 7$$

Here, fabs (rs2)=fabs (y2t) denotes the absolute value of y2t [63:0], and therefore an AND circuit 174 in FIG. 1 executes an AND operation on the sign bit [63] of y2t of the register rs2 (nd2) and the inverted bit "0" of the instruction classification code Ftrimaddd=1 such that the sign bit [63] is always inverted to "0" (positive). The reason for this is that in response to the first auxiliary instruction Ftrismuld, bqx [0] is stored in the sign bit [63] of y2t [63:0], and therefore the sign bit of y2t, y2t[63], is used as the select bit of the selector 170 of the coefficient memory 160. Hence, y2t [63:0], which is obtained by the AND circuit 174 modifying the sign bit y2t [63] of y2t to "0", is input into the multiply-add arithmetic unit 100.

Further, the coefficient 7 (1/15!) is extracted from the coefficient memory 160 on the basis of index=7 and y2t [63]=0 and input into the add operand (the third input operand) of the multiply-add arithmetic unit 100 via the selector 180. The multiply-add arithmetic unit 100 then executes a multiply-add operation on the input c0=0.0, y2t [63:0]=$y^2$, and the coefficient 7 (1/15!), whereupon the coefficient 7 is stored in the register r.

Next, the arithmetic processing device fetches the third auxiliary instruction Ftrimaddd and the operation code r, y2t, 6, r, and executes the following operation.

Ftrimaddd r, y2t, 6, r

In this operation processing, the result r of the previous Ftrimaddd is input into the first multiply operand (the first input operand) of the multiply-add arithmetic unit 100, while y2t [63:0] modified to an absolute value by the AND circuit 174 is input into the second multiply operand (the second input operand). Further, the coefficient (1/13!) extracted from the coefficient memory 160 on the basis of index=6 and y2t [63]=bqx [0] is input into the add operand (the third input operand) of the multiply-add arithmetic unit via the selectors 170, 172, 180. The multiply-add arithmetic unit then executes the following operation and stores the operation result in the register r.

$$r=r*y2t[62:0]+\text{coefficient } 6(1/13!)$$

Similarly thereafter, the degree (index) is reduced to 11, 9, 7, 5, 3, 1 (5, 4, 3, 2, 1, 0) in that order, whereupon a similar operation is executed repeatedly using the operation code corresponding to the third auxiliary instruction Ftrimaddd in FIG. 13. As a result, the operation result r of the third from last stage in FIG. 13 is obtained.

Next, the multiply operation Fmuld (multiply) and the operands r, rs2=ys, r are executed, whereupon the following operation is executed.

Fmuld r, ys, r

In this operation processing, the value in the register r, which is determined by executing the auxiliary instruction Ftrimaddd repeatedly, is multiplied by the value of the variable ys (=y, 1.0, −y, −1.0) calculated in accordance with the second auxiliary instruction Ftrisseld in the pre-processing, and the result is stored in the register r. As a result of this operation, the polynomial on the bottom row of FIG. 14 is multiplied by one of the variables ys (=y, 1.0, −y, −1.0). Accordingly, as illustrated in FIG. 7, an odd number function is obtained in the case of sin (x) and −sin (x), and an even number function is obtained in the case of cos (x), and −cos (x).

Further, in response to a store instruction Stfdf, the result r is stored in the entry mem of the register file 140.

Hence, by providing the trigonometric function operation auxiliary instruction Ftrimaddd and the coefficient memory 160, the selectors 170, 172, and the AND circuit 174, which are operated in response to this instruction, the operation of the Taylor series expansion function can be executed with a smaller number of instructions, and as a result, the post-processing can be performed at an increased speed.

Improved Arithmetic Processing Device According to this Embodiment

In the arithmetic processing device of FIG. 1, when a Taylor expansion operation is carried out for the trigonometric function sin (x), the first and second auxiliary instructions Ftrismuld and Ftrisseld are executed during the pre-processing, illustrated in FIG. 12, and during the post-processing, illustrated in FIG. 13, the third auxiliary instruction Ftrimaddd is executed repeatedly, whereupon the multiply instruction Fmuld is executed. A data dependence relationship exists between the pre-processing and the post-processing, and therefore the results y2t and ys obtained from the first auxiliary instruction Ftrismuld and the second auxiliary instruction Ftrisseld, respectively, during the pre-processing are needed to execute the third auxiliary instruction Ftrimaddd and the multiply instruction Fmuld during the post-processing.

In this case, the result ys obtained from Ftrisseld during the pre-processing is not used up to the multiply instruction Fmuld in the latter half of the post-processing, and therefore this dependence relationship does not affect the performance of the arithmetic processing. However, the result y2t obtained from Ftrismuld during the pre-processing is used immediately thereafter by the third auxiliary instruction Ftrimaddd during the post-processing, and therefore operation latency in the first auxiliary instruction Ftrismuld causes a bottleneck in the overall performance of the arithmetic processing of the trigonometric function.

Typically, to solve a performance bottleneck caused by a data dependence relationship, a bypass path may be provided so that the result y2t of the first auxiliary instruction Ftrismuld of the pre-processing is supplied directly to the input of the third auxiliary instruction Ftrimaddd of the post-processing along the bypass path.

However, the result y2t [63:0] of the first auxiliary instruction Ftrismuld of the pre-processing includes y2t [63]=bqx [0] and y2t [62:0]=$y^2$ [62:0], and accordingly, y2t [62:0]=$y^2$ [62:0] and the coefficient selected from the coefficient memory on the basis of y2t [63]=bqx [0] are input into the input of the multiply-add arithmetic unit 100 executing the third auxiliary instruction Ftrimaddd of the post-processing. Hence, in the result y2t [63:0] of the first auxiliary instruction Ftrismuld of the pre-processing, the number of logic steps taken to input the coefficient selected from the coefficient memory on the basis of y2t [63]=bqx [0] into the multiply-add arithmetic unit 100 executing the third auxiliary instruction Ftrimaddd of the post-processing is greater than the number of logic steps taken to input y2t [62:0]=$y^2$ [62:0] into the multiply-add arithmetic unit 100 executing Ftrimaddd. As a result, the number of logic steps taken to input the coefficient selected from the coefficient memory on the basis of y2t [63]=bqx [0] into the multiply-add arithmetic unit 100 executing Ftrimaddd constitutes a critical path of the arithmetic processing. A specific configuration of the arithmetic processing device will be described below.

Figure 15:
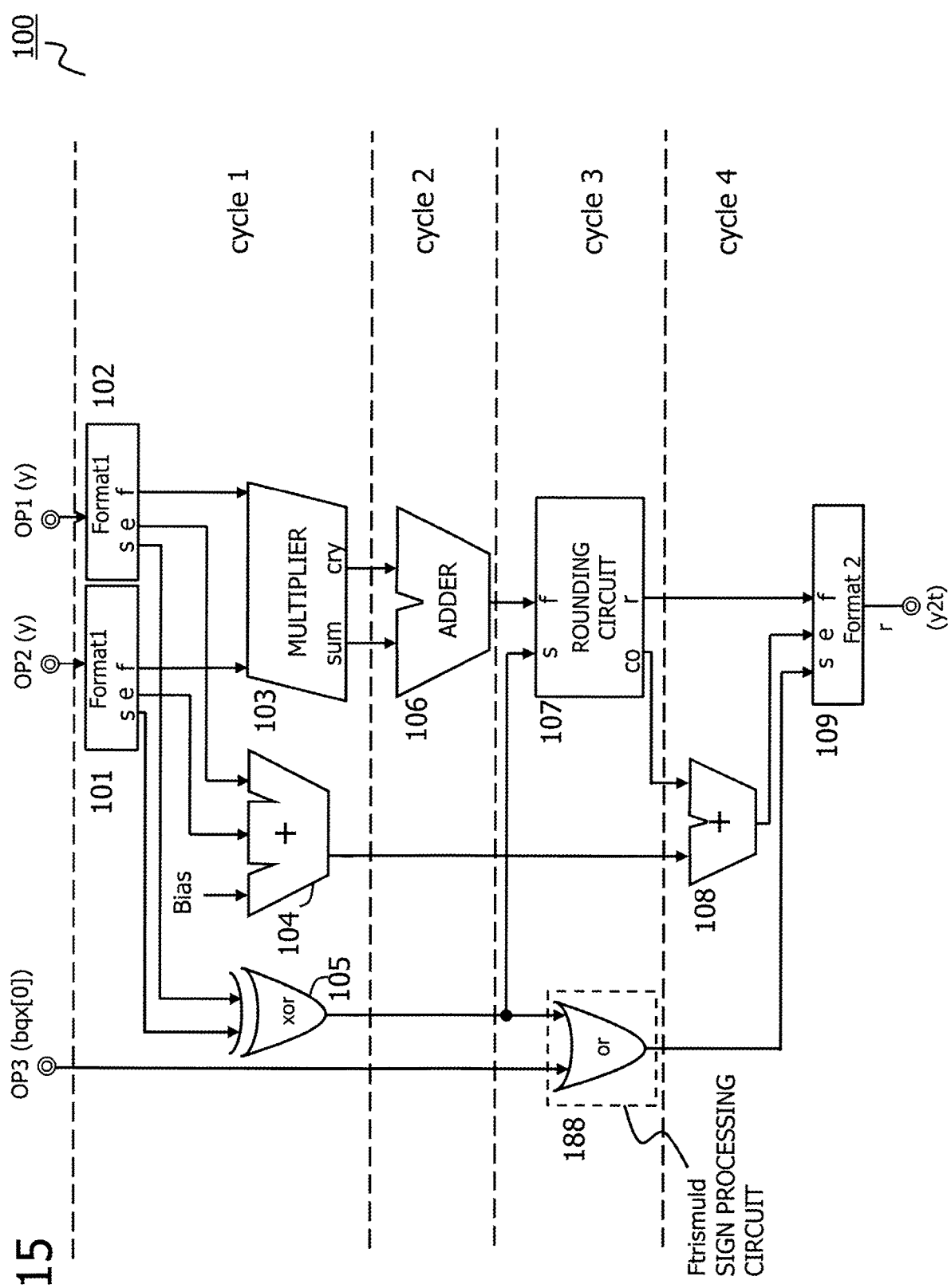
FIG. 15 is a view illustrating in detail the configuration of a multiplier part of the multiply-add arithmetic unit 100.

FIG. 15 is a view illustrating in detail the configuration of a multiplier part of the multiply-add arithmetic unit 100. The multiplier part of the multiply-add arithmetic unit is configured such that in the case of the first auxiliary instruction Ftrismuld of the pre-processing, inputs y, y are input into input operands OP1, OP2 (respective operand registers 101, 102), and the least significant bit bqx [0] of the expansion point identification data bqx [63:0] is input into an input operand OP3.

The multiplier of the multiply-add arithmetic unit 100 includes, in a cycle 1 stage, the operand registers 101, 102 of the input operands OP1, OP2, a multiplier 103 for multiplying mantissas f of the inputs y, an adder 104 for adding an exponent portion e and a bias Bias, and an EOR circuit 105 for a sign portion s. Further, in a cycle 2 stage, the multiplier includes an adder 106 for adding a multiplication result sum and a carry cry obtained by the multiplier 103. In a cycle 3 stage, the multiplier includes a rounding circuit 107 into which a mantissa f that is the output of the adder 106 and the sign portion s that is the output of the EOR 105 are input, and an OR circuit 188 input the sign portion s that is the output of the EOR 105 and bqx [0]. Furthermore, in a cycle 4 stage, the multiplier includes an adder 108 and a register 109 for the result r. Latch circuits, not depicted in the figure, are provided on boundaries between the respective cycles, and the latch circuits latch the inputs in synchronization with a clock.

Figure 16:
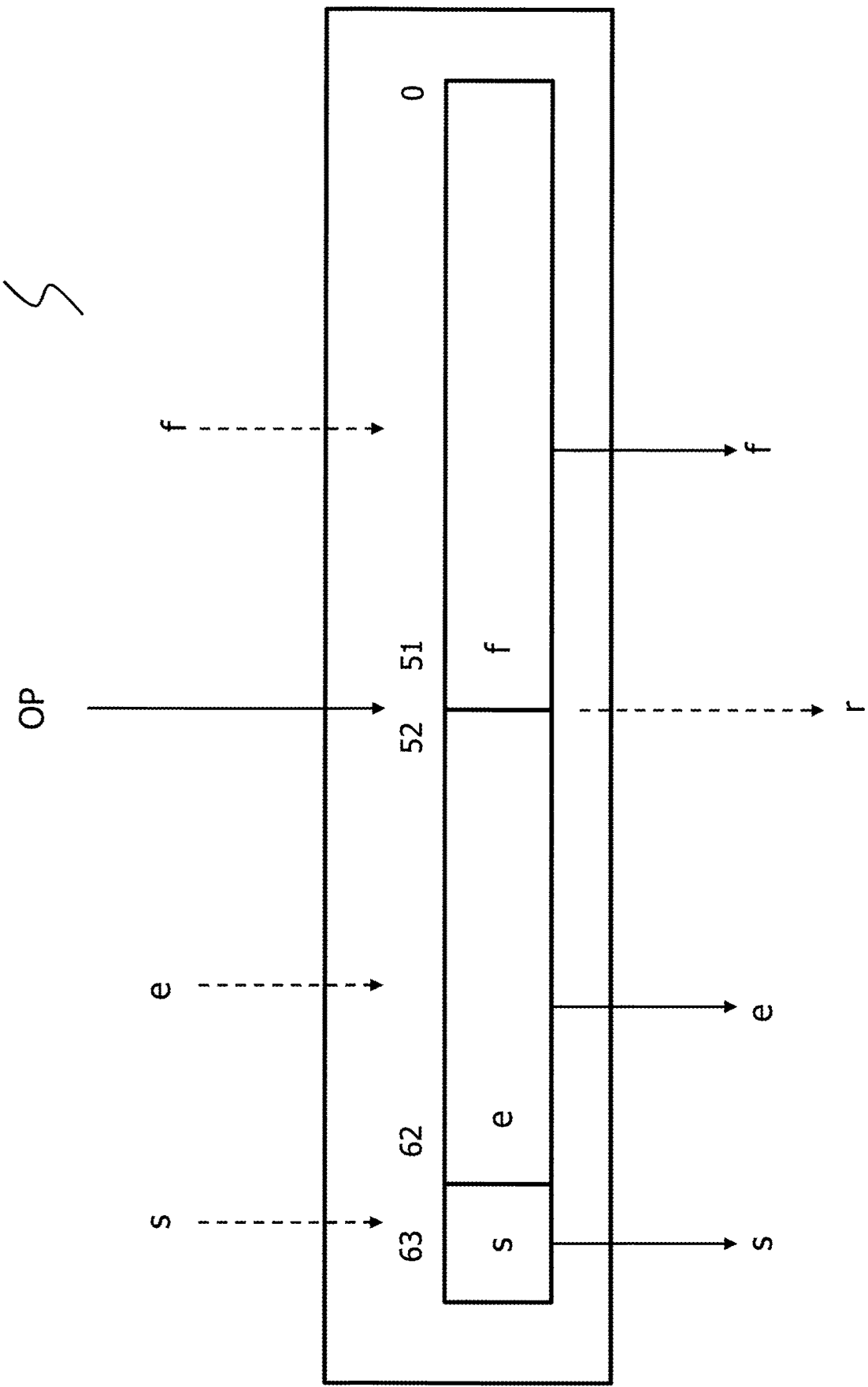
FIG. 16 is a view illustrating a format of the input registers 101, 102 and the result register 109.

FIG. 16 is a view illustrating a format of the input registers 101, 102 and the result register 109. This example illustrates a double-precision floating point, in which the most significant bit [63] stores the sign portion s, [62:52] bits stores the exponent portion e, and [51:0] bits stores the mantissa f. Further, solid line input and output arrows illustrate an example of the input registers 101, 102, while dotted line input and output arrows illustrate an example of the output register 109.

Figure 17:
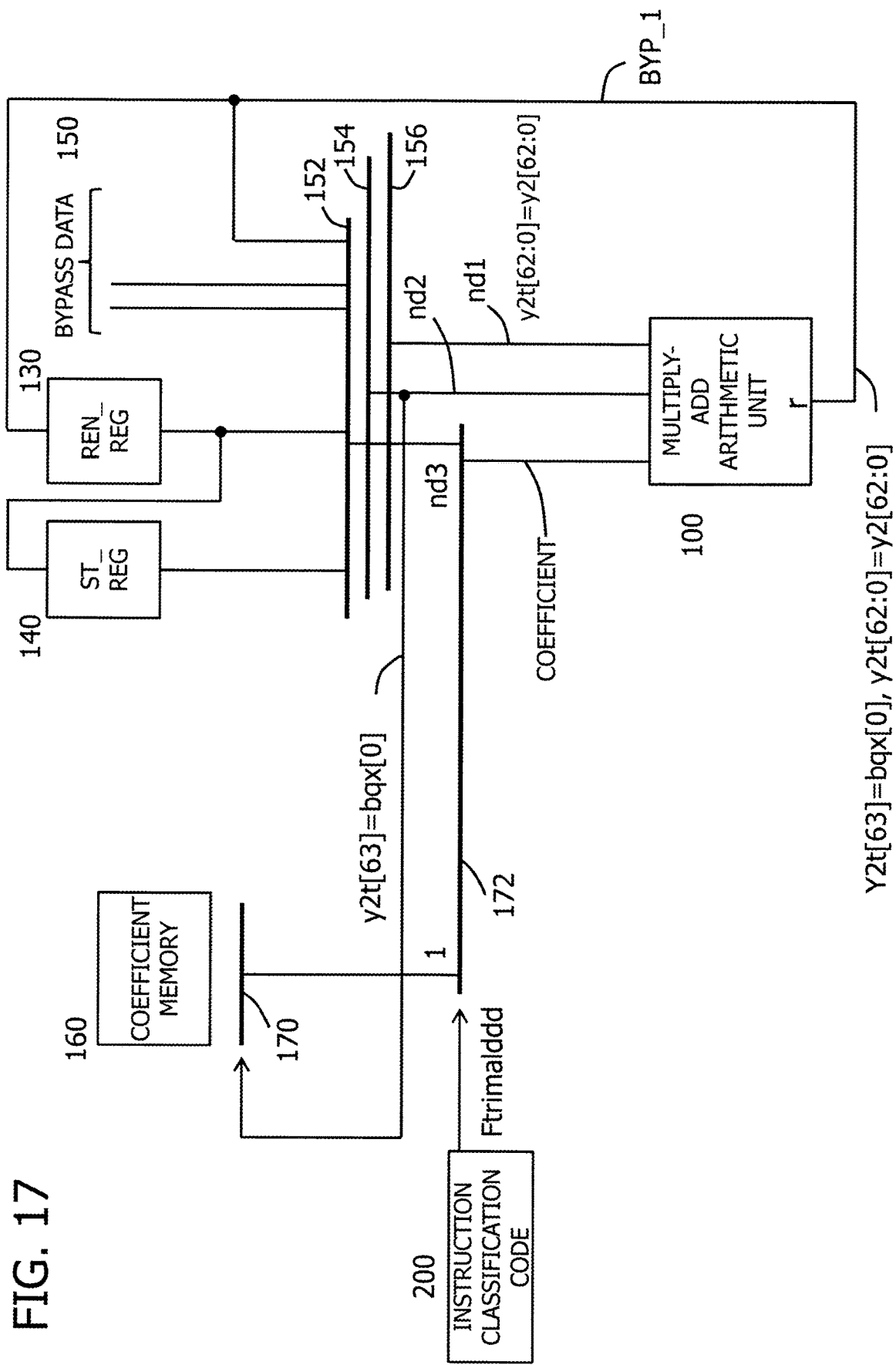
FIG. 17 is a view illustrating a bypass path of the arithmetic processing device of FIG. 1.

FIG. 17 is a view illustrating a bypass path of the arithmetic processing device of FIG. 1. The output r of the multiply-add arithmetic unit 100 (in the case of Ftrismuld, y2t [63], y2t [62:0]) is input into a group of selectors 152-156 along the bypass path BYP_1. Further, y2t [63] =bqx [0], which is selected by the multiplexer 154 and diverges from the node nd2, is input into the selector 170 of the coefficient memory 160, whereupon the coefficient selected by the selector 170 is selected by the selector 172 in accordance with Ftrimaddd=1 and then input into the multiply-add arithmetic unit 100. On the other hand, y2t [62:0]=$y^2$ [62:0] in the node nd2, which is selected by the multiplexer 154, is input directly into the multiply-add arithmetic unit 100. Hence, the number of logic steps taken by y2t [63]=bqx [0], which is included in the output r of the multiply-add arithmetic unit 100, to reach the input of the multiply-add arithmetic unit via the OR circuit 188, the selectors 190, 192, the bypass path BYP_1, the multiplexer 154, the selector 170, and the selector 172 in FIG. 1 constitutes a critical path up to the start of execution of the following third auxiliary instruction Ftrimaddd, and therefore determines the cycle (the frequency) of the arithmetic unit.

Figure 18:
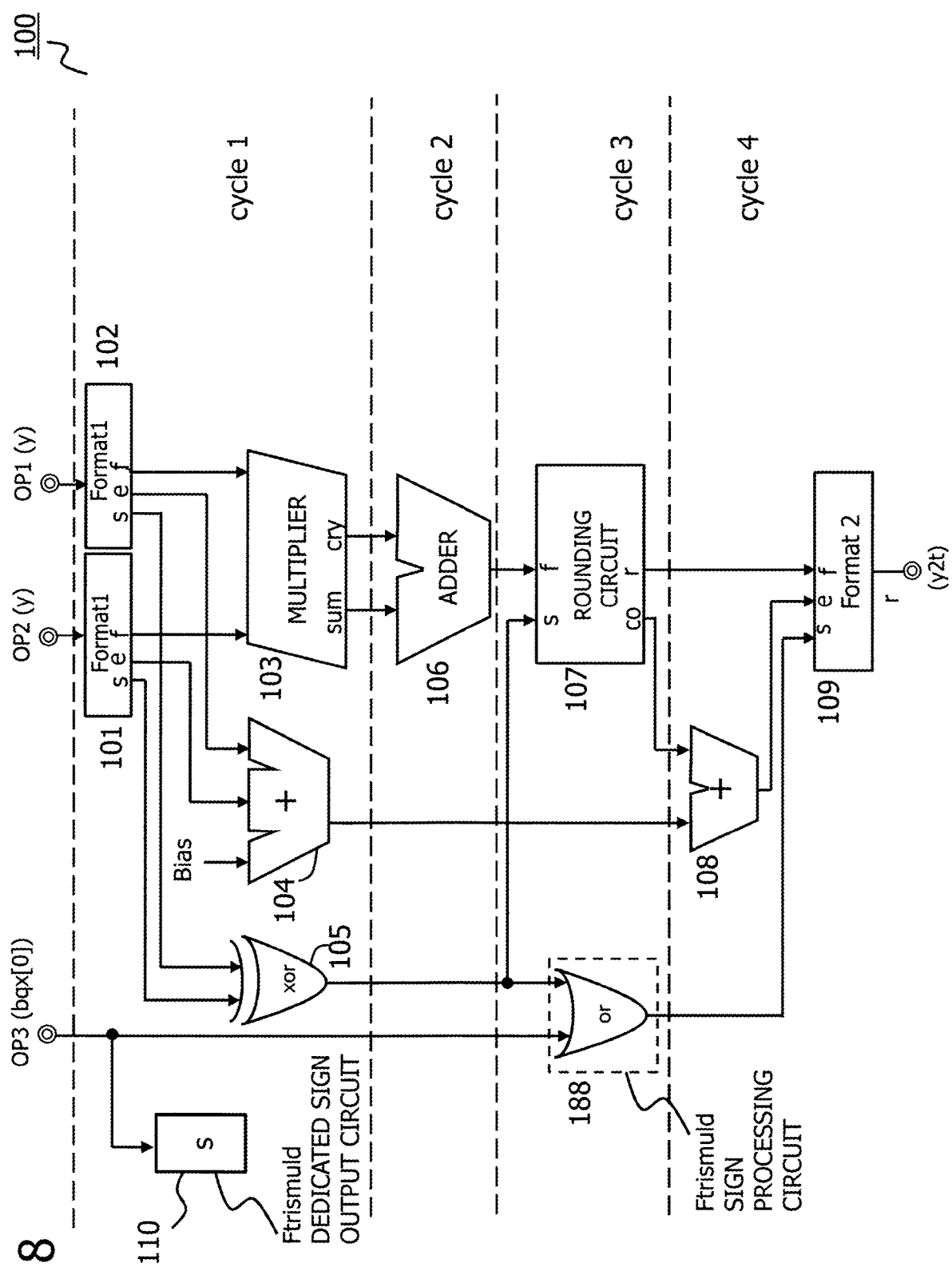
FIG. 18 is a view illustrating a configuration including the multiplier part of the multiply-add arithmetic unit 100 according to this embodiment.

FIG. 18 is a view illustrating a configuration including the multiplier part of the multiply-add arithmetic unit 100 according to this embodiment. In the multiply-add arithmetic unit 100 illustrated in FIG. 18, a Ftrismuld-dedicated sign output circuit 110 is provided in the cycle 1 stage. All other configurations are identical to FIG. 15.

The Ftrismuld-dedicated sign output circuit 110 is a latch circuit provided in the cycle 1 stage in order to latch the least significant bit bqx [0] of the expansion point identification data input into the operand OP3. As noted above, during Ftrismuld, the square of y=(x−x0), input into the operands OP1, OP2, is always positive (sign bit s=0), and therefore the output of the OR circuit 188 serving as the sign processing circuit of Ftrismuld is always equal to the input bqx [0] of the operand OP3. Hence, in this embodiment, instead of including the sign bit s (y2t [63]=bqx [0]), which is the output of the OR circuit 188, in the result r and inputting the resulting value into the selector 170 of the coefficient memory along the bypass path BYP_1, the input bqx [0] of the operand OP3 is latched and output by the Ftrismuld-dedicated sign output circuit (the latch circuit) 110 in the cycle 1 stage of the multiply-add arithmetic unit 100.

Figure 19:
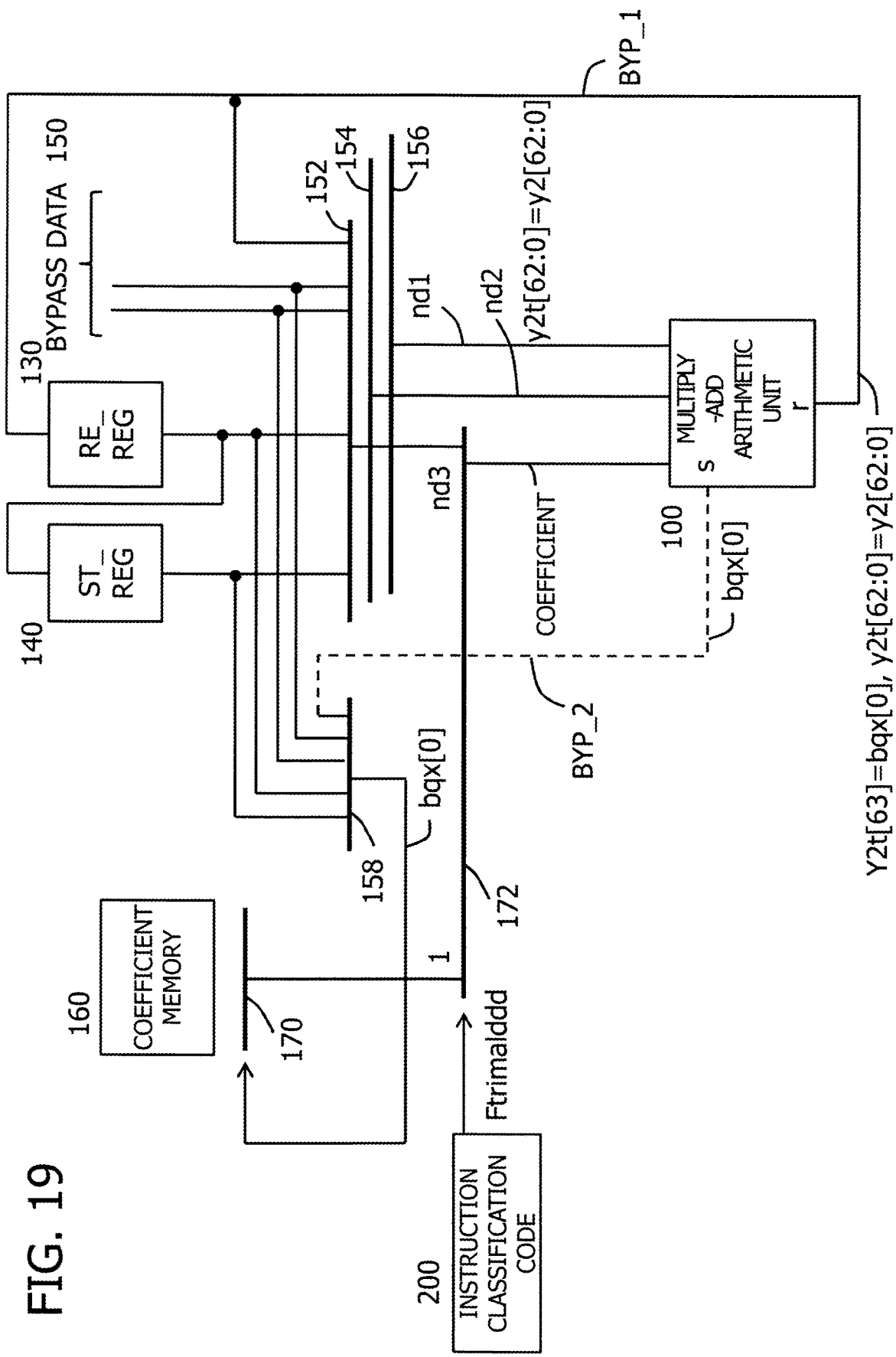
FIG. 19 is a view illustrating bypass paths of the arithmetic processing device according to this embodiment.

FIG. 19 is a view illustrating bypass paths of the arithmetic processing device according to this embodiment. FIG. 19 differs from FIG. 18 in having a second bypass path BYP_2 that bypasses the output bqx [0] of the dedicated sign output circuit 110 of the multiply-add arithmetic unit 100, and a selector 158 into which the second bypass path BYP_2 is input together with other registers 140, 130 and bypass data 150, and which outputs the selected bqx [0] to the selector 170 of the coefficient memory 160.

In the auxiliary instruction Ftrimaddd of the post-processing, the selector 158 selects the second bypass path BYP_2 so as to supply the output bqx [0] of the dedicated sign output circuit 110 of the multiply-add arithmetic unit 100 to the selector 170 of the coefficient memory 160, whereupon the coefficient selected by the selector 170 is input into the multiply-add arithmetic unit 100 via the selector 172.

With the configuration and operation described above, while the operation result r=y2t [63:0] of the auxiliary instruction Ftrismuld of the pre-processing is generated in four cycles in the multiply-add arithmetic unit 100, the output bqx [0] of the dedicated sign output circuit 110 provided in the cycle 1 stage of the multiply-add arithmetic unit 100 is output several cycles, i.e. 3 cycles, earlier than the operation result r. Moreover, the output bqx [0] is supplied to the selector 170 via the second bypass path BYP_2 and the selector 158. Hence, the time taken from execution of the auxiliary instruction Ftrismuld of the pre-processing to input of the coefficient used for the auxiliary instruction Ftrimaddd of the post-processing into the multiply-add arithmetic unit 100 can be shortened by an amount corresponding to the number of logic steps of the several cycles executed by the multiply-add arithmetic unit 100 and the number of logic steps of the selectors 190 and 192, which are short-cut by the second bypass path BYP_2, and as a result, the critical path can be improved, i.e. shorter.

Figure 20:
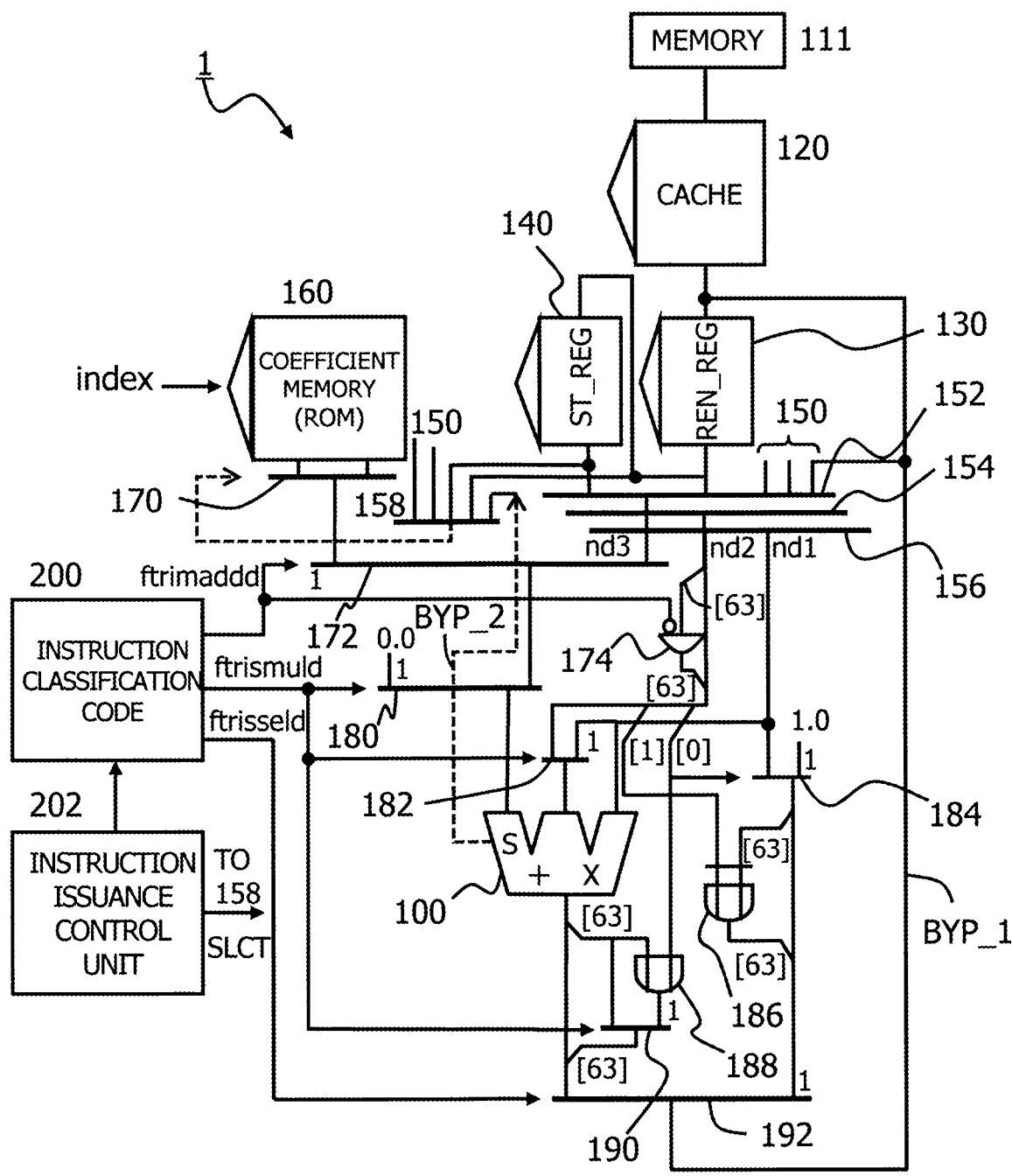
FIG. 20 is a view illustrating a configuration of the arithmetic processing device 1 according to this embodiment.

FIG. 20 is a view illustrating a configuration of the arithmetic processing device 1 according to this embodiment. This configuration differs from the configuration of FIG. 1 in that the second bypass path BYP_2 and the selector 158 of FIG. 19 are provided, and an instruction issuance control unit 202 is illustrated. More specifically, the second bypass path BYP_2, which is connected to a dedicated sign output s of the multiply-add arithmetic unit 100, the selector 158, which selects bqx [0] supplied on the second bypass path BYP_2 and supplies bqx [0] to the selector 170 of the coefficient memory, and wiring extending from the selector 158 to the selector 170 are newly provided.

Figure 21:
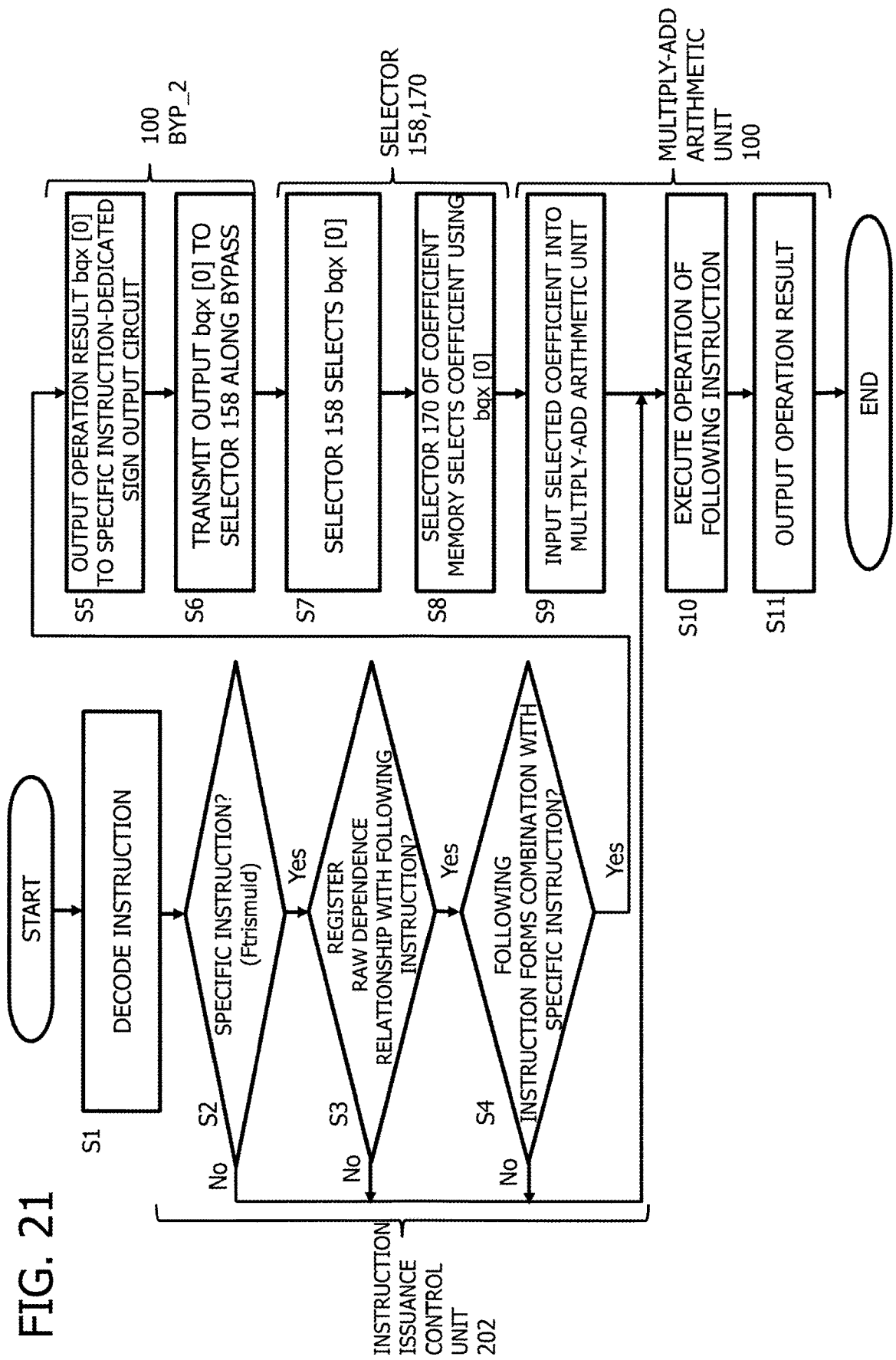
FIG. 21 is a flowchart illustrating operations of the arithmetic processing device of FIG. 20, including the instruction issuance control unit 202.

FIG. 21 is a flowchart illustrating operations of the arithmetic processing device of FIG. 20, including the instruction issuance control unit 202. First, the instruction issuance control unit 202 decodes an instruction (S1) and determines whether or not the decoded instruction is a specific instruction (S2). For example, in the case of the trigonometric function operation described above, the specific instruction is the first auxiliary instruction Ftrismuld of the pre-processing.

When the decoded instruction is the specific instruction (YES in S2), the instruction issuance control unit determines whether or not the specific instruction has a register read after write (RAW) dependence relationship with the following instruction (S3). A RAW dependence relationship is a relationship in which, after a preceding instruction writes an operation result to a register, the following instruction always reads the operation result. In the case of the trigonometric function operation described above, the following instruction Ftrimaddd is related to the specific instruction Ftrismuld in that during Ftrimaddd, an operation is executed using the operation results y2t [63], y2t [62:0] written to the naming register by the specific instruction Ftrismuld.

Finally, the instruction issuance control unit 202 determines whether or not the following instruction has a predetermined combination relationship with the specific instruction (S4). In the example described above, Ftrimaddd has a predetermined combination relationship with Ftrismuld.

Subsequent operations are performed by the arithmetic processing device, whereby the multiply-add arithmetic unit 100 outputs the operation result y2t [63]=bqx [0] to the dedicated sign output circuit 110 for the specific instruction Ftrismuld (S5), and the output y2t [63]=bqx [0] thereof is supplied to the selector 158 along the dedicated bypass path BYP_2 (S6). The selector 158 then selects y2t [63]=bqx [0] as a selection signal of the coefficient memory (S7), whereupon the selector 170 selects a coefficient in the coefficient memory in accordance with the selection signal y2t [63] =bqx [0] (S8) and inputs the selected coefficient into the multiply-add arithmetic unit (S9). The multiply-add arithmetic unit 100, having received the selected coefficient and y2t [62:0] calculated during Ftrismuld, executes the following instruction Ftrimaddd (S10) and outputs the operation result (S11).

As illustrated in FIG. 20, when steps S2, S3, and S4 in FIG. 21 are all affirmative (YES), the instruction issuance control unit 202 outputs a selection signal SLCT for selecting the second bypass path BYP_2 to the selector 158. Accordingly, the selection signal bqx [0] of the coefficient memory is supplied to the selector 170 from the Ftrismuld-dedicated sign output circuit 110 (S in FIG. 20) of the multiply-add arithmetic unit 100 along a path constituted by the second bypass path BYP_2, the selector 158, and the selector 170.

When any one of steps S2, S3, and S4 in FIG. 21 is negative, on the other hand, the signal bqx [0] is supplied along a path constituted by the selectors 190, 192, the first bypass path BYP_1, the renaming register 130, the selector 158, and the selector 170.

Example of Trigonometric Function cos (x)

A structure for improving the arithmetic processing device was described above using the trigonometric function sin (x) as an example. However, the arithmetic processing device may be improved in a similar fashion, leading to shortening of the critical path, in the case of the trigonometric function cos (x).

FIG. 22 is a table summarizing relationships between the least significant two bits of bqx=qx % 4 and the function to be expanded, as well as the Taylor series expansion thereof, in the case of the trigonometric function cos (x). The principles are identical to those of the trigonometric function sin (x), illustrated in FIG. 6, i.e.

(1) In a range $-\pi/4 < x \le +\pi/4$ (where qx=4N and N is an integer), when x0=0 etc., cos (x)=cos (x−x0)=cos (y)

(2) In a range of $+\pi/4 < x \le +3\pi/4$ (where qx=4N+1), when x0=$\pi/2$ etc., cos (x)=−sin (x−x0)=−sin (y)

(3) In a range of $+3\pi/4 < x \le +5\pi/4$ (or $-5\pi/4 < y = x-x0 \le -3\pi/4$) (where qx=4N+2), when x0=$\pi$ or $-\pi$ etc., cos (x)=−cos (x−x0)=−cos (y)

(4) In a range of $-3\pi/4 < x \le -\pi/4$ (where qx=4N+3), when x0=$3\pi/2$ or $-\pi/2$ etc., cos (x)=sin (x−x0)=sin (y)

According to FIG. 22, when bqx [0]=0, the coefficient of cos (x) is selected, and when bqx [0]=1, the coefficient of sin (x) is selected. In other words, when an inverted bit ~bqx [0]=0, the coefficient of sin (x) is selected, and when ~bqx [0]=1, the coefficient of cos (x) is selected. ~ denotes inversion. Further, in the auxiliary instruction Ftimaddd of the post-processing, 1.0 is selected when bqx [0]=0, and y is selected when bqx [0]=1. Moreover, when bqx [0]^bqx [1]=0, the sign bit is set at y2t [63]=0 (positive), and when bqx [0]^bqx [1]=1, the sign bit is set at y2t [63]=1 (negative).

First Auxiliary Instruction Ftricmuld

FIG. 23 is a table illustrating assembler descriptions of auxiliary instructions Ftricmuld, Ftricseld of the pre-processing in the case of the trigonometric function cos (x) and specific examples of cases in which the instructions are applied to the trigonometric function cos (x).

First, the assembler descriptions of the first auxiliary instruction Ftricmuld are as follows.

Ftricmuld rs1 rs2 rd

Further, the processing content is as follows.

$$rd=(rs1*rs1)|(\tilde{}rs2[0]<<63)$$

In other words, the processing content includes squaring the value of the register (a double-precision floating point register, for example) specified by rs1 and storing the result of setting an inversion ~rs2 [0] of the least significant bit of the register specified by rs2 as the sign bit [63] in the register specified by rd.

An example of the auxiliary instruction Ftricmuld used to calculate the trigonometric function cos (x) and the processing content thereof are as follows.

Ftricmuld y, bqx, y2t $$rd=(y*y)|(\tilde{}bqx[0]<<63)$$

More specifically, the processing content includes calculating $y^2$ with an operand and replacing the sign bit that is the most significant bit of $y^2$ with the inversion ~bqx [0] of the least significant bit of bqx. Since $y^2$ is positive, the processing for replacing the sign bit with the inversion ~bqx [0] of the least significant bit of bqx may be an OR operation executed on the sign bit (positive) of $y^2$ and ~bqx [0].

Second Auxiliary Instruction Ftricseld

The assembler descriptions of the second auxiliary instruction Ftricseld are as follows.

Ftricseld rs1, rs2, rd

Further, the processing content is as follows.

$$rd=((rs2[0]?rs1:1.0)^{\wedge}((rs2[1]^{\wedge}rs2[0])<<63)$$

In other words, the processing content includes selecting either the value in the register specified by rs1 or 1.0 based on the least significant bit rs2 [0] of the value in the register specified by rs2, obtaining the EOR of the sign bit [63] of this value rs1 or 1.0 and the EOR of the first bit rs2 [1] and the least significant bit rs2 [0] of the value in the rs2 register, and storing the obtained EOR in the register specified by rd.

An example of the auxiliary instruction Ftricseld used to calculate the trigonometric function cos (x) and the processing content thereof are as follows.

Ftricseld y, bqx, ys $$rd=((bqx[0]?y:1.0)^{\wedge}((bqx[1]^{\wedge}bqx[0])<<63)$$

More specifically, the processing content includes selecting 1.0 when bqx [0]=0 and selecting y when bqx [0]=1, obtaining the EOR of the sign bit [63] of the selected value and the EOR of bqx [1] and bqx [0], and storing the result in the register specified by rd. In other words, when, in accordance with the EOR, bqx [1]^bqx [0]=1, the sign bit [63] of the selected value is inverted.

Figure 24:
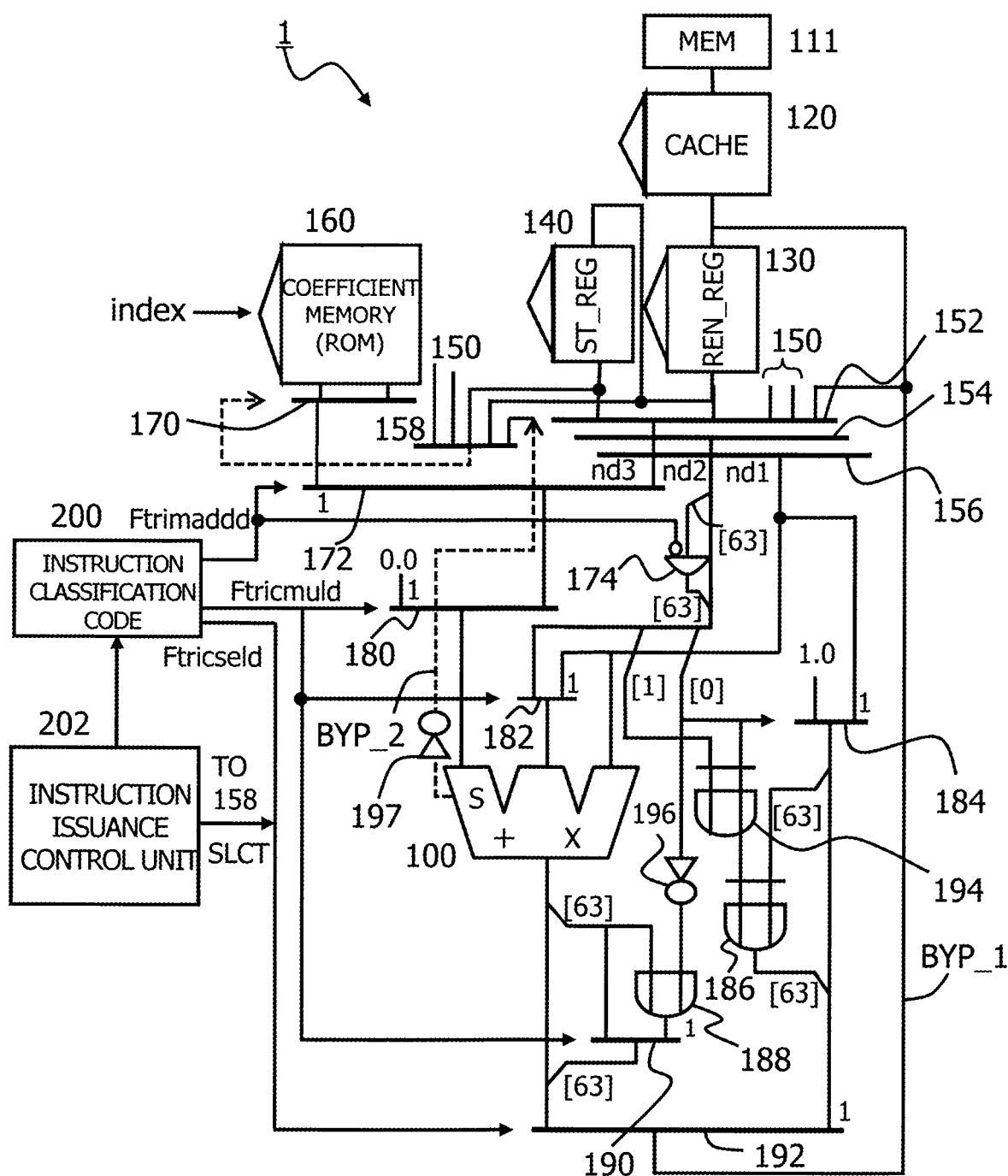
FIG. 24 is a view illustrating a configuration of the arithmetic processing device 1 in the case of the trigonometric function cos (x).

FIG. 24 is a view illustrating a configuration of the arithmetic processing device 1 in the case of the trigonometric function cos (x). Similarly to FIGS. 1 and 20, in FIG. 24, the inverter 196, the OR circuit 188, and the selector 190 are provided for the auxiliary instruction Ftricmuld. Further, the selector 184, EOR circuits 194, 186, and the selector 192 are provided for the auxiliary instruction Ftricseld.

Furthermore, the multiply-add arithmetic unit 100 is configured similarly to FIG. 18. The second bypass path BYP_2 and an inverter 197 are provided to supply the output s of the Ftricmuld-dedicated sign output circuit 110 of the multiply-add arithmetic unit 100 to the selector 158. Moreover, when a combination of the auxiliary instructions Ftricmuld and Ftrimaddd is executed, the instruction issuance control unit 202 outputs the selection signal SLCT to the selector 158 for selecting the signal bqx [0] of the second bypass path BYP_2. Thus, during execution of the auxiliary instruction Ftrimaddd, the number of logic steps on the supply path of the selection signal bqx [0] of the coefficient of Ftricmuld serving as the specific instruction is reduced, and as a result, the critical path is shortened.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device comprising:
a register file;
a coefficient memory that stores coefficients of Taylor series expansions of trigonometric functions, which are selected by a coefficient index, and includes a coefficient selector (170) that outputs a coefficient selected in accordance with a coefficient selection signal;

a multiply-add arithmetic unit (100) that executes a multiply-add operation on first, second, and third inputs;

a first bypass path (BYP_1) on which an output of the multiply-add arithmetic unit is supplied to the register file;

first, second, and third multiplexers that select either the register file or the first bypass path and output data to the first, second, and third inputs of the multiply-add arithmetic unit;

an OR circuit (188) that calculates an OR of a sign bit of the output of the multiply-add arithmetic unit and a least significant bit (rs2 [0]=bqx [0]) of the second input;

a first selector (184) that selects either the first input or a value "1.0";

an EOR circuit (186) that calculates an EOR of a first bit (rs2 [1]=bqx [1]) of the second input and a sign bit of an output of the first selector; and a second bypass path (BYP_2) on which the least significant bit (rs2 [0]=bqx [0]) of the second input of the multiply-add arithmetic unit is supplied to the coefficient selector, wherein, when an operation of a trigonometric function sin (x) is executed, the arithmetic processing device:

calculating, in advance, expansion point identification data (bqx=qx % 4), which is a remainder (qx % 4) when an integer (qx) obtained by dividing an input x of the trigonometric function by π/2 is divided by 4, and y=x−x0, which is obtained by subtracting an expansion point x0 (bqx*π/2) from the input x, the expansion point x0 (bqx*π/2) being obtained by multiplying the expansion point identification data (bqx) by π/2, executing a first auxiliary instruction having y and the expansion point identification data (bqx) as first and second inputs, respectively, and a first variable (y2t) as an output, wherein the multiply-add arithmetic unit determines a square value (y2t) by squaring the first input (y), the OR circuit determines an OR of a least significant bit (bqx [0]) of the expansion point identification data (bqx) that is the second input and a sign bit (y2t [63]) of the square value, and the OR is stored in the sign bit of the square value (y2t) to determine the first variable (y2t), executing a second auxiliary instruction having y and the expansion point identification data (bqx) as first and second inputs, respectively, and a second variable (ys) as an output, wherein the first selector selects either the first input (y) or a value "1.0" on the basis of the least significant bit (bqx [0]) of the expansion point identification data, the EOR circuit determines an EOR of a sign bit ([63]) of the selected data and a first bit (bqx [1]) of the expansion point identification data, and the determined EOR is stored in the sign bit of the selected data to determine the second variable (ys), and repeatedly executing a third auxiliary instruction for executing a multiply-add operation having a previous operation output (r), the first variable (y2t), and the coefficient index as first, second, and third inputs, respectively, by the multiply-add arithmetic unit, while modifying the coefficient index from a maximum value to a minimum value, and multiplying an output of the repeatedly executed third auxiliary instruction by the second variable (ys) determined by the second auxiliary instruction to calculate the trigonometric function sin (x).

2. The arithmetic processing device according to claim 1, wherein the coefficient memory selects a coefficient corresponding to a degree of the Taylor expansion operation of the trigonometric function on the basis of the coefficient index, and the coefficient selector selects either a coefficient of sin (x) or a coefficient of cos (x) on the basis of the least significant bit of the expansion point identification data.

3. An arithmetic processing device comprising:

a register file;

a coefficient memory that stores coefficients of Taylor series expansions of trigonometric functions, which are selected by a coefficient index, and includes a coefficient selector (170) that outputs a coefficient selected in accordance with a coefficient selection signal;

a multiply-add arithmetic unit (100) that executes a multiply-add operation on first, second, and third inputs;

a first bypass path (BYP_1) on which an output of the multiply-add arithmetic unit is supplied to the register file;

first, second, and third multiplexers that select either the register file or the first bypass path and output data to the first, second, and third inputs of the multiply-add arithmetic unit;

an OR circuit (188) that calculates an OR of a sign bit of the output of the multiply-add arithmetic unit and an inverted least significant bit (~rs2 [0]=~bqx [0]) of the second input;

a first selector (184) that selects either the first input or a value "1.0";

a first EOR circuit (194) that calculates a first EOR of a least significant bit (rs[0]=bqx[0]) and a first bit (rs2 [1]=bqx[1]) of the second output;

a second EOR circuit (186) that calculates a second EOR of the first EOR and a sign bit of an output of the first selector; and a second bypass path (BYP_2) on which the inverted least significant bit (~rs2 [0]=~bqx [0]) of the second input of the multiply-add arithmetic unit is supplied to the coefficient selector, wherein, when an operation of a trigonometric function cos (x) is executed, the arithmetic processing device:

calculating, in advance, expansion point identification data (bqx=qx % 4), which is a remainder (qx % 4) when an integer (qx) obtained by dividing an input x of the trigonometric function by π/2 is divided by 4, and y=x−x0, which is obtained by subtracting an expansion point x0 (bqx*π/2) from the input x, the expansion point x0 (bqx*π/2) being obtained by multiplying the expansion point identification data (bqx) by π/2, executing a first auxiliary instruction having y and the expansion point identification data (bqx) as first and second inputs, respectively, and a first variable (y2t) as an output, wherein the multiply-add arithmetic unit determines a square value (y2t) by squaring the first input y, the OR circuit determines an OR of an inverted bit of a least significant bit (bqx [0]) of the expansion point identification data bqx and a sign bit (y2t [63]) of the square value, and the OR is stored in the sign bit of the square value (y2t) to determine the first variable (y2t), executing a second auxiliary instruction having y and the expansion point identification data (bqx) as first and second inputs, respectively, and a second variable (ys) as an output, wherein the first selector selects either the first input y or a value "1.0" on the basis of the least significant bit (bqx [0]) of the expansion point identification data, the first EOR circuit determines the first EOR of a least significant bit (bqx[0]) and a first bit (bqx[1]) of the expansion point identification data, the second EOR circuit determines the second EOR of the first EOR and a sign bit ([63]) of the selected data of the first selector, and the determined second EOR is stored in the sign bit of the selected data to determine the second variable (ys), and repeatedly executing a third auxiliary instruction for executing a multiply-add operation having a previous operation output (r), the first variable (y2t), and the coefficient index as first, second, and third inputs, respectively, by the multiply-add arithmetic unit, while modifying the coefficient index from a maximum value to a minimum value, and multiplying an output of the repeatedly executed third auxiliary instruction by the second variable (ys) determined by the second auxiliary instruction to calculate the trigonometric function cos (x).

4. The arithmetic processing device according to claim 3, wherein the coefficient memory selects a coefficient corresponding to a degree of the Taylor expansion operation of the trigonometric function on the basis of the coefficient index, and the coefficient selector selects either a coefficient of sin (x) or a coefficient of cos (x) on the basis of the inverted least significant bit of the expansion point identification data.

5. A method of controlling an arithmetic processing device, the method comprising:
the arithmetic processing device, which includes:
a register file;
a coefficient memory that stores coefficients of Taylor series expansions of trigonometric functions, which are selected by a coefficient index, and includes a coefficient selector (170) that outputs a coefficient selected in accordance with a coefficient selection signal;
a multiply-add arithmetic unit (100) that executes a multiply-add operation on first, second, and third inputs;
a first bypass path (BYP_1) on which an output of the multiply-add arithmetic unit is supplied to the register file;
first, second, and third multiplexers that select either the register file or the first bypass path and output data to the first, second, and third inputs of the multiply-add arithmetic unit;
an OR circuit (188) that calculates an OR of a sign bit of the output of the multiply-add arithmetic unit and a least significant bit (rs2 [0]=bqx [0]) of the second input;
a first selector (184) that selects either the first input or a value "1.0";
an EOR circuit (186) that calculates an EOR of a first bit (rs2 [1]=bqx [1]) of the second input and a sign bit of an output of the first selector; and
a second bypass path (BYP_2) on which the least significant bit (rs2 [0]=bqx [0]) of the second input of the multiply-add arithmetic unit is supplied to the coefficient selector,
when an operation of a trigonometric function sin (x) is executed,
calculating, in advance, expansion point identification data (bqx=qx % 4), which is a remainder (qx % 4) when an integer (qx) obtained by dividing an input x of the trigonometric function by π/2 is divided by 4, and y=x−x0, which is obtained by subtracting an expansion point x0 (bqx*π/2) from the input x, the expansion point x0 (bqx*π/2) being obtained by multiplying the expansion point identification data (bqx) by π/2, executing a first auxiliary instruction having y and the expansion point identification data (bqx) as first and second inputs, respectively, and a first variable y2t as an output, wherein the multiply-add arithmetic unit determines a square value (y2t) by squaring the first input y, the OR circuit determines an OR of a least significant bit (bqx [0]) of the expansion point identification data (bqx) that is the second input and a sign bit (y2t [63]) of the square value, and the OR is stored in the sign bit of the square value (y2t) to determine the first variable (y2t), executing a second auxiliary instruction having y and the expansion point identification data (bqx) as first and second inputs, respectively, and a second variable (ys) as an output, wherein the first selector selects either the first input (y) or a value "1.0" on the basis of the least significant bit (bqx [0]) of the expansion point identification data, the EOR circuit determines an EOR of a sign bit ([63]) of the selected data and a first bit (bqx [1]) of the expansion point identification data, and the determined EOR is stored in the sign bit of the selected data to determine the second variable (ys), and repeatedly executing a third auxiliary instruction for executing a multiply-add operation having a previous operation output (r), the first variable (y2t), and the coefficient index as first, second, and third inputs, respectively, by the multiply-add arithmetic unit, while modifying the coefficient index from a maximum value to a minimum value, and multiplying an output of the repeatedly executed third auxiliary instruction by the second variable (ys) determined by the second auxiliary instruction to calculate the trigonometric function sin (x).

6. A method of controlling an arithmetic processing device, the method comprising:
the arithmetic processing device, which includes:
a register file;
a coefficient memory that stores coefficients of Taylor series expansions of trigonometric functions, which are selected by a coefficient index, and includes a coefficient selector (170) that outputs a coefficient selected in accordance with a coefficient selection signal;
a multiply-add arithmetic unit (100) that executes a multiply-add operation on first, second, and third inputs;
a first bypass path (BYP_1) on which an output of the multiply-add arithmetic unit is supplied to the register file;
first, second, and third multiplexers that select either the register file or the first bypass path and output data to the first, second, and third inputs of the multiply-add arithmetic unit;
an OR circuit (188) that calculates an OR of a sign bit of the output of the multiply-add arithmetic unit and an inverted least significant bit (~rs2 [0]=~bqx [0]) of the second input;
a first selector (184) that selects either the first input or a value "1.0";
a first EOR circuit (194) that calculates a first EOR of a least significant bit (rs[0]=bqx[0]) and a first bit (rs2 [1]=bqx[1]) of the second output;
a second EOR circuit (186) that calculates a second EOR of the first EOR and a sign bit of an output of the first selector; and
a second bypass path (BYP_2) on which the inverted least significant bit (~rs2 [0]=~bqx [0]) of the second input of the multiply-add arithmetic unit is supplied to the coefficient selector, when an operation of a trigonometric function cos (x) is executed, calculating, in advance, expansion point identification data (bqx=qx % 4), which is a remainder (qx % 4) when an integer (qx) obtained by dividing an input x of the trigonometric function by $\pi/2$ is divided by 4, and y=x−x0, which is obtained by subtracting an expansion point x0 (bqx*$\pi/2$) from the input x, the expansion point x0 (bqx*$\pi/2$) being obtained by multiplying the expansion point identification data (bqx) by $\pi/2$, executing a first auxiliary instruction having y and the expansion point identification data (bqx) as first and second inputs, respectively, and a first variable (y2t) as an output, wherein the multiply-add arithmetic unit determines a square value (y2t) by squaring the first input y, the OR circuit determines an OR of an inverted bit of a least significant bit (bqx [0]) of the expansion point identification data bqx and a sign bit (y2t [63]) of the square value, and the OR is stored in the sign bit of the square value (y2t) to determine the first variable (y2t), executing a second auxiliary instruction having y and the expansion point identification data (bqx) as first and second inputs, respectively, and a second variable (ys) as an output, wherein the first selector selects either the first input y or a value "1.0" on the basis of the least significant bit (bqx [0]) of the expansion point identification data, the first EOR circuit determines the first EOR of a least significant bit (bqx[0]) and a first bit (bqx[1]) of the expansion point identification data, the second EOR circuit determines the second EOR of the first EOR and a sign bit ([63]) of the selected data of the first selector, and the determined second EOR is stored in the sign bit of the selected data to determine the second variable (ys), and repeatedly executing a third auxiliary instruction for executing a multiply-add operation having a previous operation output (r), the first variable (y2t), and the coefficient index as first, second, and third inputs, respectively, by the multiply-add arithmetic unit, while modifying the coefficient index from a maximum value to a minimum value, and multiplying an output of the repeatedly executed third auxiliary instruction by the second variable (ys) determined by the second auxiliary instruction to calculate the trigonometric function cos (x).

* * * * *